(12) United States Patent　　(10) Patent No.:　　US 7,739,243 B2
Erickson et al.　　(45) Date of Patent:　　Jun. 15, 2010

| (54) | SYSTEM AND METHOD FOR DYNAMICALLY CONFIGURING A MULTIPLATFORM COMPUTING ENVIRONMENT |
|---|---|
| (75) | Inventors: Andrew Lee Erickson, Rochester, MN (US); John Peter Merges, III, Rochester, MN (US); Dale William Petersilka, Rochester, MN (US); Julie Marie Smith, Rochester, MN (US) |
| (73) | Assignee: International Business Machines Corporation, Armonk, NY (US) |
| ( * ) | Notice: Subject to any disclaimer, the term of this patent is extended or adjusted under 35 U.S.C. 154(b) by 344 days. |
| (21) | Appl. No.: 11/831,992 |
| (22) | Filed: Aug. 1, 2007 |
| (65) | Prior Publication Data US 2009/0037425 A1　Feb. 5, 2009 |
| (51) | Int. Cl. *G06F 7/00* (2006.01) *G06F 17/00* (2006.01) |
| (52) | U.S. Cl. .......................... 707/681; 707/791; 705/9; 705/39 |
| (58) | Field of Classification Search .................. 707/102; 717/102 See application file for complete search history. |
| (56) | References Cited |

U.S. PATENT DOCUMENTS 6,609,108 B1 * 8/2003 Pulliam et al. ................. 705/27
7,289,964 B1 * 10/2007 Bowman-Amuah ............. 705/1
7,574,712 B2 * 8/2009 Allamaraju et al. ......... 719/318
2002/0184070 A1 * 12/2002 Chen et al. ....................... 705/9
2003/0120593 A1 * 6/2003 Bansal et al. ................. 705/39
2005/0021877 A1 * 1/2005 Varpela et al. ................. 710/1
2007/0097996 A1 * 5/2007 Millefiorini et al. ......... 370/401

* cited by examiner

*Primary Examiner*—Hosain T Alam
*Assistant Examiner*—Shew-Fen Lin
(74) *Attorney, Agent, or Firm*—Schmeiser, Olsen & Watts; John R. Pivnichny

(57) ABSTRACT

A system and associated method for dynamically configuring a multiplatform computing environment are disclosed. At least one service may form a workflow to be executed as an ordered group. A database contains configuration data, workflow control data, and workflow status data. A service configuration utility provides user interface to dynamically receive configuration data, to update the database, and to display contents of the database. A workflow entry process creates a workflow. A service monitor controls runtime behaviors of the system according to contents of the database. A service listener routes a workflow to associated services according to the configuration data in the database. A service executes a desired function, and then reports a result to the system monitor. The system monitor updates contents of the database to reflect the reported result.

28 Claims, 14 Drawing Sheets

| SC_SERVICE 711 | SC_SERVICE_KEY 712 | SC_ENABLED 713 | SC_MIN_SRVC 714 | SC_MAX_SRVC 715 |
|---|---|---|---|---|
| AUDIT_1 | ITEM | EN | 1 | 10 |
| AUDIT_2 | ITEM | EN | 1 | 5 |
| CREATE_ORDER | ITEM_ENTITY | EN | 1 | 1 |
| SEND_ORDER | ORDER | EN | 1 | 10 |
| SEND_INVOICE | ORDER | DIS | 1 | 10 |

SERVICE_CONFIG 710

| WC_WORKFLOW 731 | WC_SERVICE 732 | WC_SEQUENCE 733 | WC_NEXT_SEQUENCE 734 | WC_RETRY_SEQUENCE 735 | WC_DELAY 736 |
|---|---|---|---|---|---|
| WORKFLOW_1 | AUDIT_1 | START | 10 | START | 5 |
| WORKFLOW_1 | AUDIT_2 | 10 | 20 | START | 5 |
| WORKFLOW_1 | CREATE_ORDER | 20 | 30 | 60 | 30 |
| WORKFLOW_1 | SEND_ORDER | 30 | 40 | 60 | 30 |
| WORKFLOW_1 | SEND_INVOICE | 40 | END | 40 | 60 |

WORKFLOW_CONFIG 730

| WT_WORKFLOW 751 | WT_ITEM_KEY 752-1 | WT_ITEM-ENTITY_KEY 752-2 | WT_ORDER_KEY 752-3 | WT_SEQUENCE 753 | WT_STATUS 754 |
|---|---|---|---|---|---|
| WORKFLOW_1 | ITEM_A | GROUP_1 | -- | 20 | S |
| WORKFLOW_1 | ITEM_B | GROUP_1 | -- | 20 | S |
| WORKFLOW_1 | ITEM_B | GROUP_2 | -- | START | -- |
| WORKFLOW_1 | ITEM_C | GROUP_1 | -- | 20 | S |
| WORKFLOW_1 | ITEM_C | GROUP_3 | ORDER_1 | 40 | E |

WORKFLOW_CONTROL 750

| WS_WORKFLOW 771 | WS_SERVICE 772 | WS_SERVICE_KEY 773 | WS_SEQUENCE 774 | WS_STATUS 775 |
|---|---|---|---|---|
| WORKFLOW_1 | AUDIT_1 | ITEM_A | START | S |
| WORKFLOW_1 | AUDIT_2 | ITEM_A | 10 | E |
| WORKFLOW_1 | AUDIT_1 | ITEM_A | START | S |
| WORKFLOW_1 | AUDIT_2 | ITEM_A | 10 | S |
| WORKFLOW_1 | CREATE_ORDER | GROUP_1 | 20 | S |

WORKFLOW_STATUS 770

FIG. 7

SYSTEM AND METHOD FOR DYNAMICALLY CONFIGURING A MULTIPLATFORM COMPUTING ENVIRONMENT

FIELD OF THE INVENTION

The present invention discloses a system and associated method for dynamically configuring a multiplatform computing environment.

BACKGROUND OF THE INVENTION

Conventional static configuration systems of applications in a multiplatform environment require complicated manipulation to change the contents of configuration. Also, events cannot be grouped based on a service that an event provides.

To change configuration in a conventional multiplatform computing environment, users of such system need support from a system administrator who is skilled and authorized to reconfigure the system. Thus, users cannot efficiently utilize the system as they need. In cases of database manipulation, any portion of database manipulation requiring changes of the contents of system configuration must be handled by a system administrator as well. Also, in a conventional system using static configuration, it is impossible to group related events and process a group of events by one service.

Consequently, there is a need for a system and associated method to overcome at least one of the preceding disadvantages of current static configuration systems in a multiplatform environment.

SUMMARY OF THE INVENTION

The present invention provides a method for dynamically configuring a multiplatform computing system comprising at least one service, at least one workflow, a service configuration utility, a workflow entry process, a service monitor, at least one service listener, and a database, wherein at least one service, said at least one workflow, the service configuration utility, the workflow entry process, the service monitor, and said at least one service listener are executed on the multiplatform computing system, wherein the multiplatform computing system comprises at least one computer system, wherein the database is coupled to the multiplatform computing system, wherein the database comprises at least one service configuration record, at least one workflow configuration record, at least one workflow control record, and at least one workflow status record, the method comprising:

receiving a dynamic configuration request from a user through the service configuration utility, wherein said dynamic configuration request comprises a first data set to configure said at least one service and a second data set to configure said at least one workflow;

updating contents of the database pursuant to the first data set and the second data set of the received dynamic configuration request; and processing said at least one workflow pursuant to the updated contents of the database, wherein each service configuration record of said at least one service configuration record comprises a service identifier field and a service key field, wherein each workflow configuration record of said at least one workflow configuration record comprises a workflow identifier field and a service field, wherein each workflow control record of said at least one workflow control record comprises a workflow identifier field, wherein each workflow status record of said at least one workflow status record comprises a workflow identifier field.

The present invention provides a computer program product, comprising a computer usable medium having a computer readable program code embodied therein, said computer readable program code containing instructions that when executed by a processor of a computer system implement a method for dynamically configuring a multiplatform computing system comprising at least one service, at least one workflow, a service configuration utility, a workflow entry process, a service monitor, at least one service listener, and a database, wherein at least one service, said at least one workflow, the service configuration utility, the workflow entry process, the service monitor, and said at least one service listener are executed on the multiplatform computing system, wherein the multiplatform computing system comprises at least one computer system, wherein the database is coupled to the multiplatform computing system, wherein the database comprises at least one service configuration record, at least one workflow configuration record, at least one workflow control record, and at least one workflow status record, the method comprising:

receiving a dynamic configuration request from a user through the service configuration utility, wherein said dynamic configuration request comprises a first data set to configure said at least one service and a second data set to configure said at least one workflow;

updating contents of the database pursuant to the first data set and the second data set of the received dynamic configuration request; and processing said at least one workflow pursuant to the updated contents of the database, wherein each service configuration record of said at least one service configuration record comprises a service identifier field and a service key field, wherein each workflow configuration record of said at least one workflow configuration record comprises a workflow identifier field and a service field, wherein each workflow control record of said at least one workflow control record comprises a workflow identifier field, wherein each workflow status record of said at least one workflow status record comprises a workflow identifier field.

The present invention provides a computer system comprising a processor and a computer readable memory unit coupled to the processor, said memory unit containing instructions that when executed by the processor implement a method for dynamically configuring a multiplatform computing system comprising at least one service, at least one workflow, a service configuration utility, a workflow entry process, a service monitor, at least one service listener, and a database, wherein at least one service, said at least one workflow, the service configuration utility, the workflow entry process, the service monitor, and said at least one service listener are executed on the multiplatform computing system, wherein the multiplatform computing system comprises at least one computer system, wherein the database is coupled to the multiplatform computing system, wherein the database comprises at least one service configuration record, at least one workflow configuration record, at least one workflow control record, and at least one workflow status record, the method comprising:

receiving a dynamic configuration request from a user through the service configuration utility, wherein said dynamic configuration request comprises a first data set to configure said at least one service and a second data set to configure said at least one workflow;

updating contents of the database pursuant to the first data set and the second data set of the received dynamic configuration request; and processing said at least one workflow pursuant to the updated contents of the database, wherein each service configuration record of said at least one service configuration record comprises a service identifier field and a service key field, wherein each workflow configuration record of said at least one workflow configuration record comprises a workflow identifier field and a service field, wherein each workflow control record of said at least one workflow control record comprises a workflow identifier field, wherein each workflow status record of said at least one workflow status record comprises a workflow identifier field.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for dynamically configuring a multiplatform computing system comprising at least one service, at least one workflow, a service configuration utility, a workflow entry process, a service monitor, at least one service listener, and a database, wherein at least one service, said at least one workflow, the service configuration utility, the workflow entry process, the service monitor, and said at least one service listener are executed on the multiplatform computing system, wherein the multiplatform computing system comprises at least one computer system, wherein the database is coupled to the multiplatform computing system, wherein the database comprises at least one service configuration record, at least one workflow configuration record, at least one workflow control record, and at least one workflow status record, the method comprising:

receiving a dynamic configuration request from a user through the service configuration utility, wherein said dynamic configuration request comprises a first data set to configure said at least one service and a second data set to configure said at least one workflow;

updating contents of the database pursuant to the first data set and the second data set of the received dynamic configuration request; and processing said at least one workflow pursuant to the updated contents of the database, wherein each service configuration record of said at least one service configuration record comprises a service identifier field and a service key field, wherein each workflow configuration record of said at least one workflow configuration record comprises a workflow identifier field and a service field, wherein each workflow control record of said at least one workflow control record comprises a workflow identifier field, wherein each workflow status record of said at least one workflow status record comprises a workflow identifier field.

The present invention provides a method and system that overcomes at least one of the current disadvantages of conventional method and system for configuring a multiplatform computing environment.

BRIEF DESCRIPTION OF THE DRAWINGS

FIG. 7 illustrates instances in relevant fields within records of the database, in accordance with embodiments of the present invention.

DETAILED DESCRIPTION OF THE INVENTION

Figure 1:
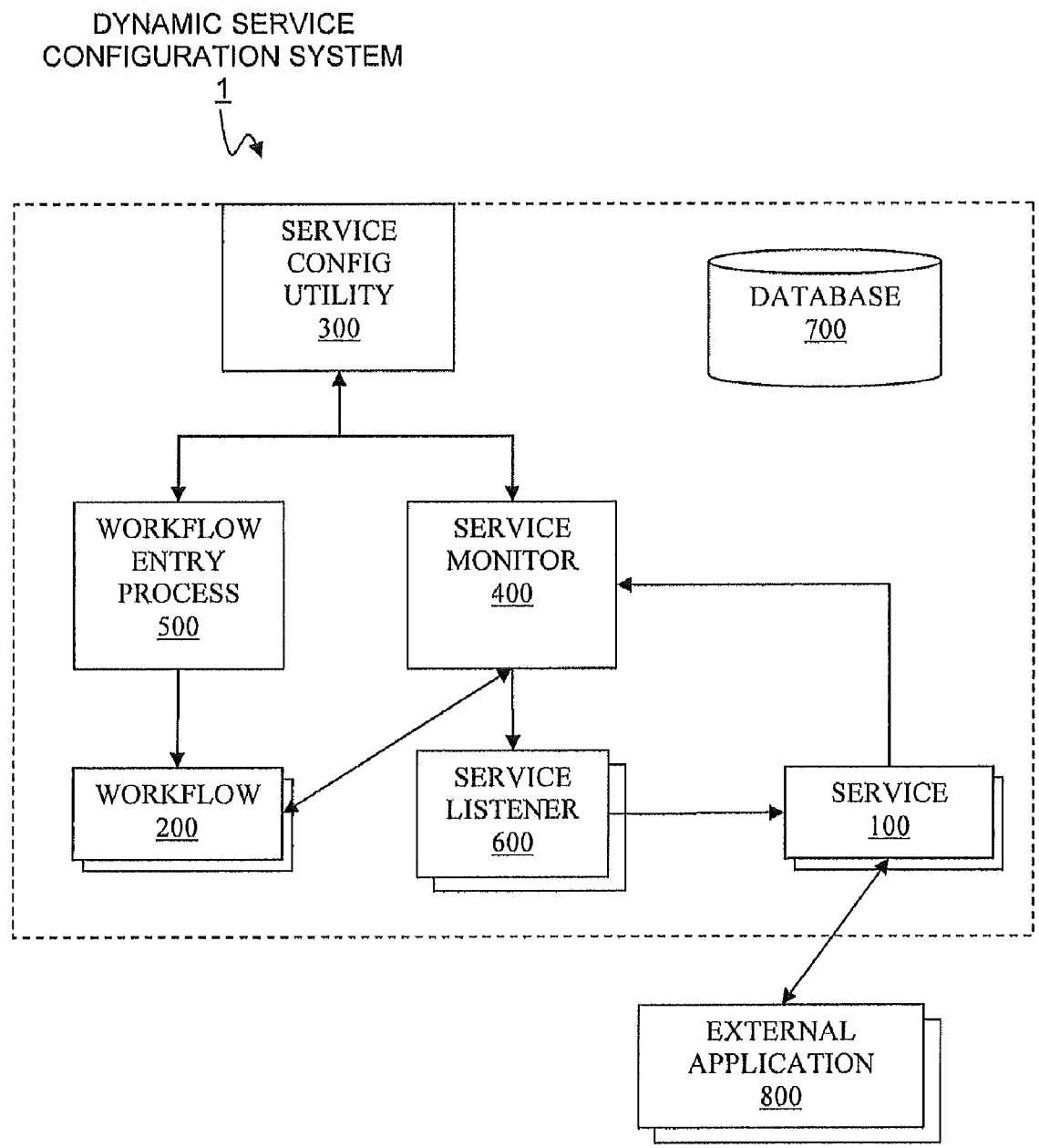
FIG. 1 illustrates a dynamic service configuration system for creating, managing, monitoring, and terminating a series of at least one event, in accordance with embodiments of the present invention.

FIG. 1 illustrates a dynamic service configuration system 1 for creating, managing, monitoring, and terminating a series of at least one event, in accordance with embodiments of the present invention.

Conventional solutions for multiplatform computing environments have limited monitoring functionality of particular events, without facilitating active management. Conventional solutions also provides simplistic database manipulation functions by enabling users to define a triggering event to invoke database manipulation, but such function is limited because the setup of triggering event is complex and because such operation requires supports from system administrator to actively manipulate database requiring reconfiguration of the system. One of the conventional solutions called dynamic message routing solution partially solves problems of static configuration. An example of dynamic message routing solutions is WebSphere Enterprise Service Bus (ESB) solution by International Business Machines (IBM). However, even in this system, it is impossible to group related events and process a group of events by one service.

To overcome disadvantages of conventional systems, the system and associated methods of the present invention enable users of multiplatform computing environment to dynamically configure the system, and to group related events based on a desired service, and to process grouped events as a single service. The present invention also enables users to actively manage, to track, and to monitor events within the system with a single interface. The present invention enables users to manage various applications spread across multiple platforms. The present invention facilitates dynamic database manipulations upon predefined triggering events without requiring administrative intervention to reconfigure the system. The present invention also enables users to manage and monitor errors occurring from the execution of external application providing the functions invoked by events in the system. The present invention also enables dynamic load balancing.

The dynamic service configuration system 1 of the present invention comprises at least one service 100, at least one workflow 200, a service configuration utility 300, a service monitor 400, a workflow entry process 500, at least one service listener 600, a database 700, and at least one external application 800.

A service 100 executes the desired external application event for the workflow. The service communicates the results to the service monitor which updates the contents of the database. The service also may refer to an interface mechanism between the system of the present invention and external applications executing a published external application. A service is a specific type of event which can be grouped together to form a workflow 200. In the system of the present invention, runtime behaviors of a service may be controlled by manipulating the context of the service configuration. A service can communicate with external applications using standard Extensive Markup Language (XML) data formats.

The term event, in programming context, refers to a software message that indicates something has happened, such as a keystroke or mouse click. Also, in the context of process control, an event is an occurrence that has happened and has been registered. The term event also interchangeably refers to a single step of operation in a sequential process flow.

The term service generally refers to a discretely defined set of contiguous and autonomous business or technical functionality, in the context of enterprise architecture, service-orientation, and service-oriented architecture (SOA). The definition of service as "a mechanism to enable access to one or more capabilities, where the access is provided using a prescribed interface and is exercised consistent with constraints and policies as specified by the service description" by the Organization for the Advancement of Structured Information Standards (OASIS) is recognized in the field of the technology. In the present invention, the specific definition of service aforementioned includes the general definition of the term service.

The workflow 200 is an instance of a workflow that is created by the workflow entry process 500. The workflow 200 emulates a thread of execution to be performed by a desired set of services. A workflow in the present invention can be dynamically configured. A workflow event means one step within a workflow.

The service configuration utility 300 is a user interface to the system of the present invention. The service configuration utility enables users to configure the system, to manipulate the database, to control workflows, to monitor results of execution, and to display the current status of the workflows in the database.

A service monitor 400 will manage each workflow, dynamically introducing additional service jobs based on service configuration and system resources. Each service utilizes a standard XML interface for communication to and from the external applications. As the workflows progress, the apparatus captures the completion results for workflow inquiries and error management.

A service monitor 400 initiates and terminates a workflows based on workflow configuration data and service configuration data associated with the workflow. The service monitor 400 dynamically manages loads on a service by adding or reducing service listeners. The service monitor 400 uses service configuration data and workflow configuration data stored in the database to send a workflow request to an appropriate service.

The service monitor 400 determines how to dynamically balance loads based on the service configuration data. The service configuration data structure comprises data fields indicating appropriate range for a number of service threads that should be active at any given time. See description in FIG. 2a, infra, for details. A user can manipulate the service configuration record to maintain proper load balance.

A workflow entry process 500 creates a workflow upon a request by a user received through the service configuration utility 300. The workflow entry process 500 uses the workflow configuration data structure in the database to initialize the workflow in the workflow control data structure in the database.

A service listener 600 is a mechanism used to connect a workflow event to a service. The service listener 600 can be controlled by users through the service monitor 400. The service listener 600 waits for a service request or a service listener request that directs to increase or to decrease the number of service listeners for a service from the service monitor 300.

Figure 2A:
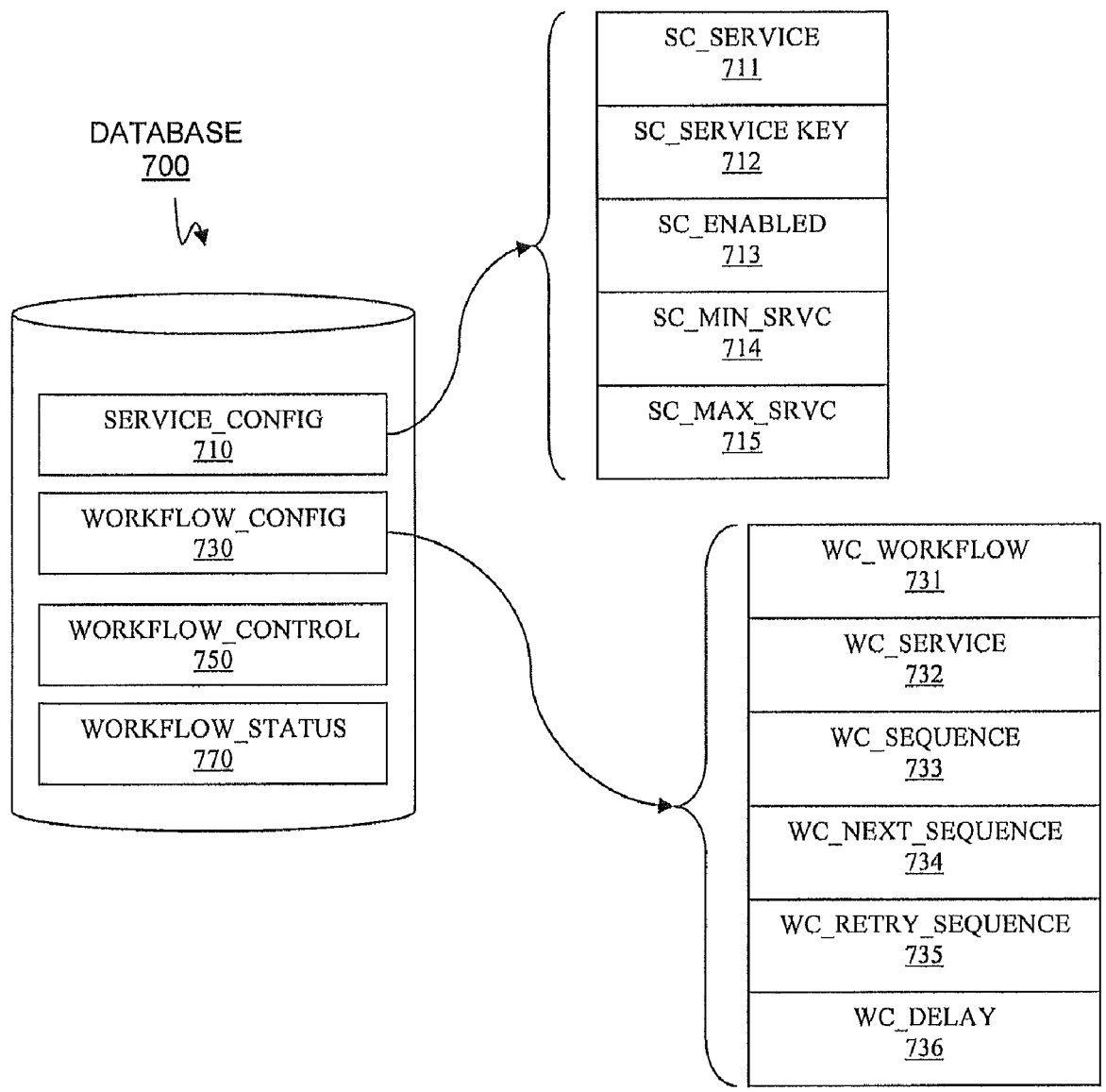
FIG. 2a depicts a service configuration data structure SERVICE_CONFIG and a workflow configuration data structure WORKFLOW_CONFIG within the database of the dynamic service configuration system, in accordance with embodiments of the present invention.
Figure 2B:
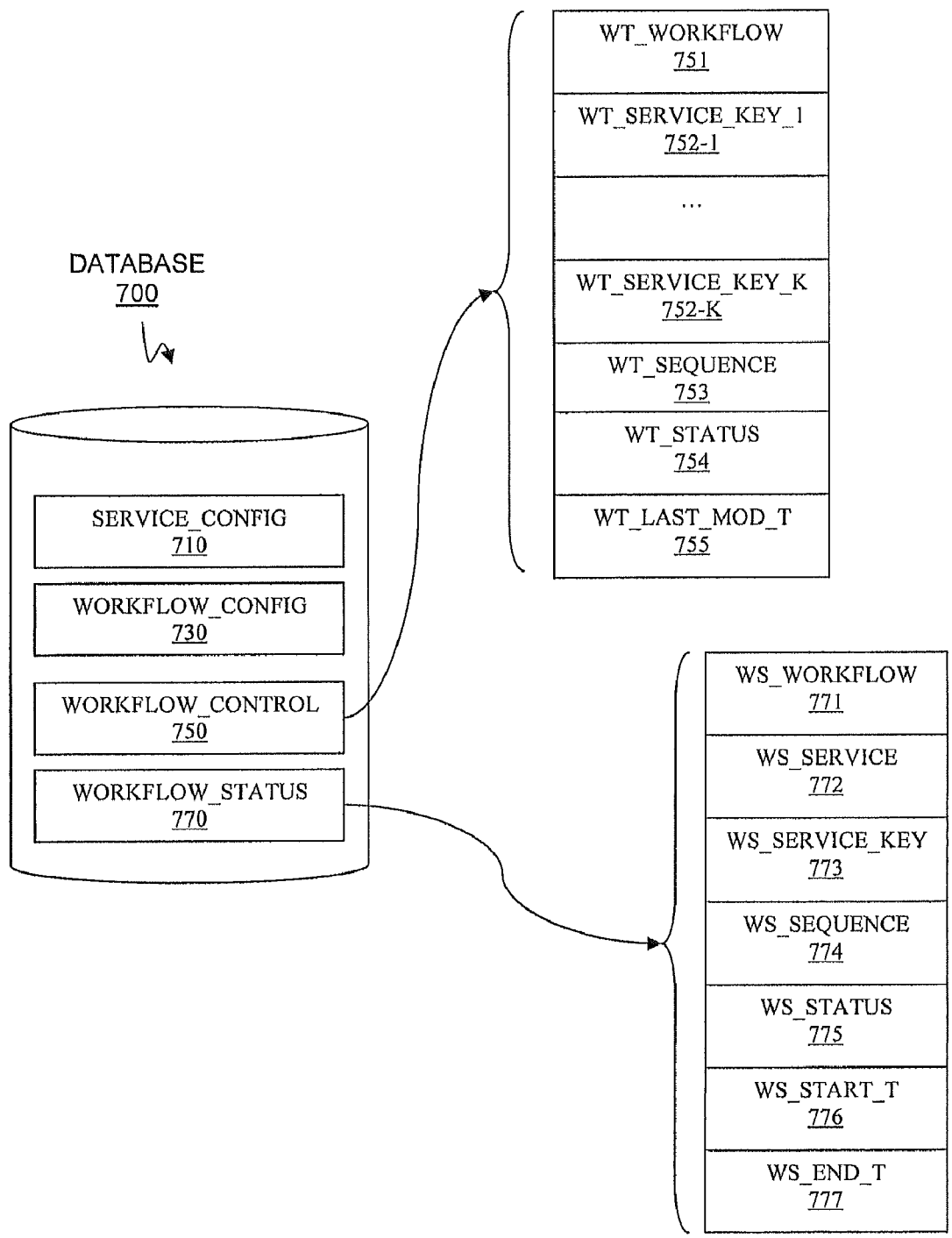
FIG. 2b depicts a workflow control data structure WORKFLOW_CONTROL and a workflow status data structure WORKFLOW_STATUS within the database of the dynamic service configuration system, in accordance with embodiments of the present invention.

The database 700 is illustrated in FIGS. 2a and 2b, infra, of the present invention. The term data structure and the term record are interchangeably used in describing the database 700.

At least one external application 800 is an application program resides beyond the system of the present invention. The external application communicates with at least one service of the system of the present invention through the standard XML interface, and provides a specific function desired in a service.

FIG. 2a depicts a service configuration data structure SERVICE_CONFIG 710 and a workflow configuration data structure WORKFLOW_CONFIG 730 within the database 700 of the dynamic service configuration system 1, in accordance with embodiments of the present invention.

At least one set of service configuration data values is stored in the database 700 of the dynamic service configuration system. The service configuration data structure SERVICE_CONFIG 710 comprises a service identifier field SC_SERVICE 711, a service key field SC_SERVICE_KEY 712, an enablement field SC_ENABLED 713, a minimum number of service threads field SC_MIN_SRVC 714, and a maximum number of service threads field SC_MAX_SRVC 715.

The service identifier field SC_SERVICE 711 holds a value that indicates the name of a service.

The service key field SC_SERVICE_KEY 712 holds a service key value that indicates a runtime environment to execute a service identified in the SC_SERVICE 711 of same service configuration record. A workflow uses the service key value to group services. The service key is one of runtime characteristics of a service. The service key triggers a service to be performed, and a service is set up to perform a particular action based on the service key. The service sends the service key to external applications through the standard XML interface. When an external application which had received the service key finishes its execution, the external application notifies the service monitor 400 of the dynamic configuration system 1 the result of the execution using the same service key as the service key that had triggered the external application. Based on the result notified, the service monitor determines whether to proceed with the next workflow event or to retry the same workflow event within the workflow in case of errors. The service key field SC_SERVICE_KEY 712 is initialized when the services are added to the service configuration record SERVICE_CONFIG 710 by the service configuration utility 300. A value of the service key field SC_SERVICE_KEY 712 must be uniquely identifiable within the system of the present invention so that the value may dictate services with the value the way how to execute a requested function.

In a first embodiment of the present invention, the service configuration data structure SERVICE_CONFIG 710 has five service configuration record instances in the database. Each service identifier field of said five service configuration record instances is: AUDIT_1, AUDIT_2, CREATE_ORDER, SEND_ORDER, and SEND_INVOICE, respectively. In the service key field SC_SERVICE_KEY field 712 of each service, AUDIT_1 and AUDIT_2 services have ITEM service key value, CREATE_ORDER service has ITEM_ENTITY service key value, and SEND_ORDER and SEND_INVOICE services have ORDER service key value, respectively. The ITEM value in the service key field in the service configuration records for the AUDIT_1 and AUDIT_2 services means that the services are configured to run based on the ITEM service key. These services having ITEM service key value may have, inter alia, a function to validate that the item exists in an inventory, to validate expenses required for the item, or to validate there is enough inventory to cover an order.

The enablement field SC_ENABLED 713 holds a value that indicates whether the service is currently enabled or not. When the service is not enabled, any workflow requiring such disabled service will be pending without being processed until the service is enabled.

The minimum number of service threads field SC_MIN_SRVC 714 holds a value indicating the minimum number of service threads that should be simultaneously running. Similarly, the maximum number of service threads field SC_MAX_SRVC 715 holds the maximum number of service threads that can be simultaneously running for the service. If the value of the SC_MAX_SRVC 715 is numeric one, the service is a single threaded service.

A workflow configuration data structure WORKFLOW_CONFIG 730 comprises a workflow identifier field WC_WORKFLOW 731, a service identifier field WC_SERVICE 732, a running sequence field WC_SEQUENCE 733, a next running sequence field WC_NEXT_SEQUENCE 734, a retry running sequence field WC_RETRY_SEQUENCE 735, and a duration of delay field WC_DELAY 736.

The workflow identifier field WC_WORKFLOW 731 holds a value identifying a workflow.

The service identifier field WC_SERVICE 732 holds a value identifying a service that is grouped into the workflow identified by WC_WORKFLOW 731.

The running sequence field WC_SEQUENCE 733 indicates a time order of executing the workflow.

The next running sequence field WC_NEXT_SEQUENCE 734 indicates a time order of executing the next step within the workflow.

The retry running sequence field WC_RETRY_SEQUENCE 735 indicates a time order of executing the workflow to retry after an error occurred while executing the workflow.

The duration of delay field WC_DELAY 736 holds the value indicating the number of seconds to delay after an occurrence of an error before retrying the sequence again. The service monitor uses the delay field to determine the period in checking the contents of the workflow control table.

FIG. 2b depicts a workflow control data structure WORKFLOW_CONTROL 750 and a workflow status data structure WORKFLOW_STATUS 770 within the database 700 of the dynamic service configuration system 1, in accordance with embodiments of the present invention.

The workflow control data structure WORKFLOW_CONTROL 750 comprises a workflow identifier field WT_WORKFLOW 751, at least one service key field WT_SERVICE_KEY_K 752-K defined in the service configuration data structure, a sequence field WT_SEQUENCE 753, a status field WT_STATUS 754, and a last modified time field WT_LAST_MOD_T 755.

The workflow identifier field WT_WORKFLOW 751 holds an instance of a workflow identifier. Each service key field WT_SERVICE_KEY_K 752-K is defined by an instance of the service key SC_SERVICE_KEY 712 in the service configuration record SERVICE_CONFIG 710.

In one embodiment of the present invention, when the service configuration data structure SERVICE_CONFIG 710 has database entries having three different instances ITEM, ITEM_ENTITY, and ORDER for the service key field SC_SERVICE_KEY 712, the workflow control data structure WORKFLOW_CONTROL 750 will have one field for each service key value, resulting in three fields of ITEM_KEY, ITEM_ENTITY_KEY, and ORDER_KEY as WT_SERVICE_KEY_1, WT_SERVICE_KEY_2, and WT_SERVICE_KEY_3, respectively.

The sequence field WT_SEQUENCE 753 holds the current sequence of the workflow.

The status field WT_STATUS 754 holds the status of the current sequence of the workflow. The status field WT_STATUS 754 may hold one value from the group consisting of null, S, E, and D. The null value means that the workflow event has not started yet. The S value means that the workflow event has started and is currently being executed. The E value means that the workflow event has erred. The D value means that the workflow event has successfully done.

The last modified time field WT_LAST_MOD_T 755 holds a date and time value when the workflow control record was last modified.

The workflow status data structure WORKFLOW_STATUS 770 comprises a workflow identifier field WS_WORKFLOW 771, a service field WS_SERVICE 772, a service key field WS_SERVICE_KEY 773, a sequence field WS_SEQUENCE 774, a status field WS_STATUS 775, a start time field WS_START_T 776, and an end time field WS_END_T 777.

The workflow identifier field WS_WORKFLOW 771 holds an instance of a workflow identifier which has been executed. The service field WS_SERVICE 772 holds an instance of a service identifier that has been executed. The service key field WS_SERVICE_KEY 773 holds an instance of a service key designating a runtime environment in which the service was executed. The sequence field WS_SEQUENCE 774 holds the sequence of the workflow to be executed. The status field WS_STATUS 775 indicates whether the sequence of the workflow was successfully executed or failed. The start time field WS_START_T 776 holds the date and time when the service had started. The end time field WS_END_T 777 holds the date and time when the service had ended.

Figure 3A:
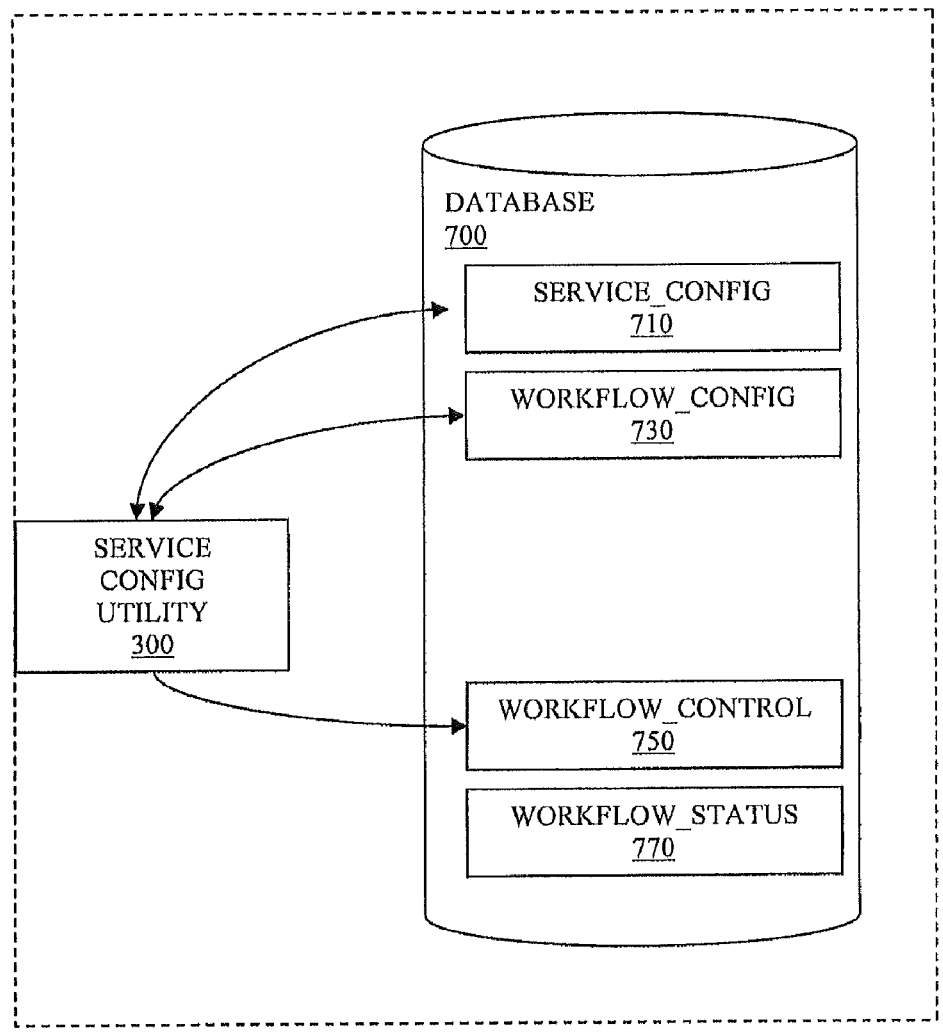
FIG. 3a depicts how a user can manipulate the database through a service configuration utility, for service configuration record SERVICE_CONFIG, workflow configuration record WORKFLOW_CONFIG, and workflow control record WORKFLOW_CONTROL, in accordance with the embodiments of the present invention.

FIG. 3a depicts how a user can manipulate the database through a service configuration utility 300, for service configuration data SERVICE_CONFIG 710, workflow configuration record WORKFLOW_CONFIG 730, and workflow control record WORKFLOW_CONTROL 750, in accordance with the embodiments of the present invention.

The service configuration utility 300 provides a user interface through which a user may configure the dynamic service configuration system of the present invention. Through the service configuration utility 300, the user may update the contents of an entry of the service configuration data structure SERVICE_CONFIG 710 and an entry of the workflow configuration data structure WORKFLOW_CONFIG 730. Also, the service configuration utility 300 provides to the user a display of the contents of the service configuration record SERVICE_CONFIG 710 and the workflow configuration record WORKFLOW_CONFIG 730. The service configuration utility 300 may update the contents of workflow control records WORKFLOW_CONTROL 750.

Figure 3B:
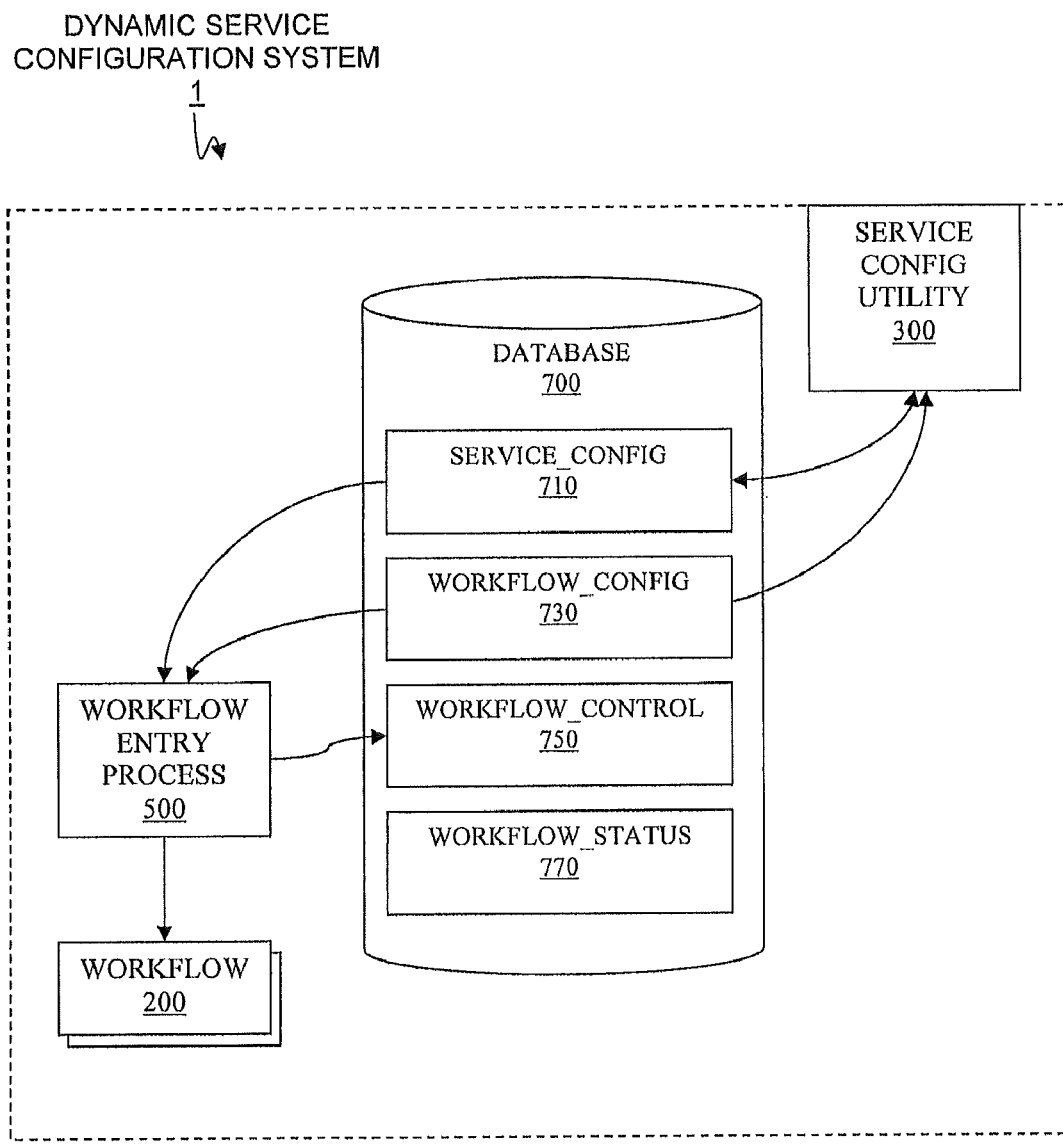
FIG. 3b depicts a flow of data in which the dynamic service configuration system creates a workflow, in accordance with the embodiments of the present invention.

FIG. 3b depicts a flow of data in which the dynamic service configuration system 1 creates a workflow, in accordance with the embodiments of the present invention.

The workflow entry process 500 retrieves records from the service configuration data structure SERVICE_CONFIG 710 and the workflow configuration data structure WORKFLOW_ CONFIG 730 to create a new workflow 200. Once the workflow 200 has been created, the workflow entry process 500 registers the workflow 200 in the workflow control data structure WORKFLOW_CONTROL 750 for further processing by the service monitor 400. See FIG. 6, infra, for the flowchart of the workflow entry process 500.

Figure 3C:
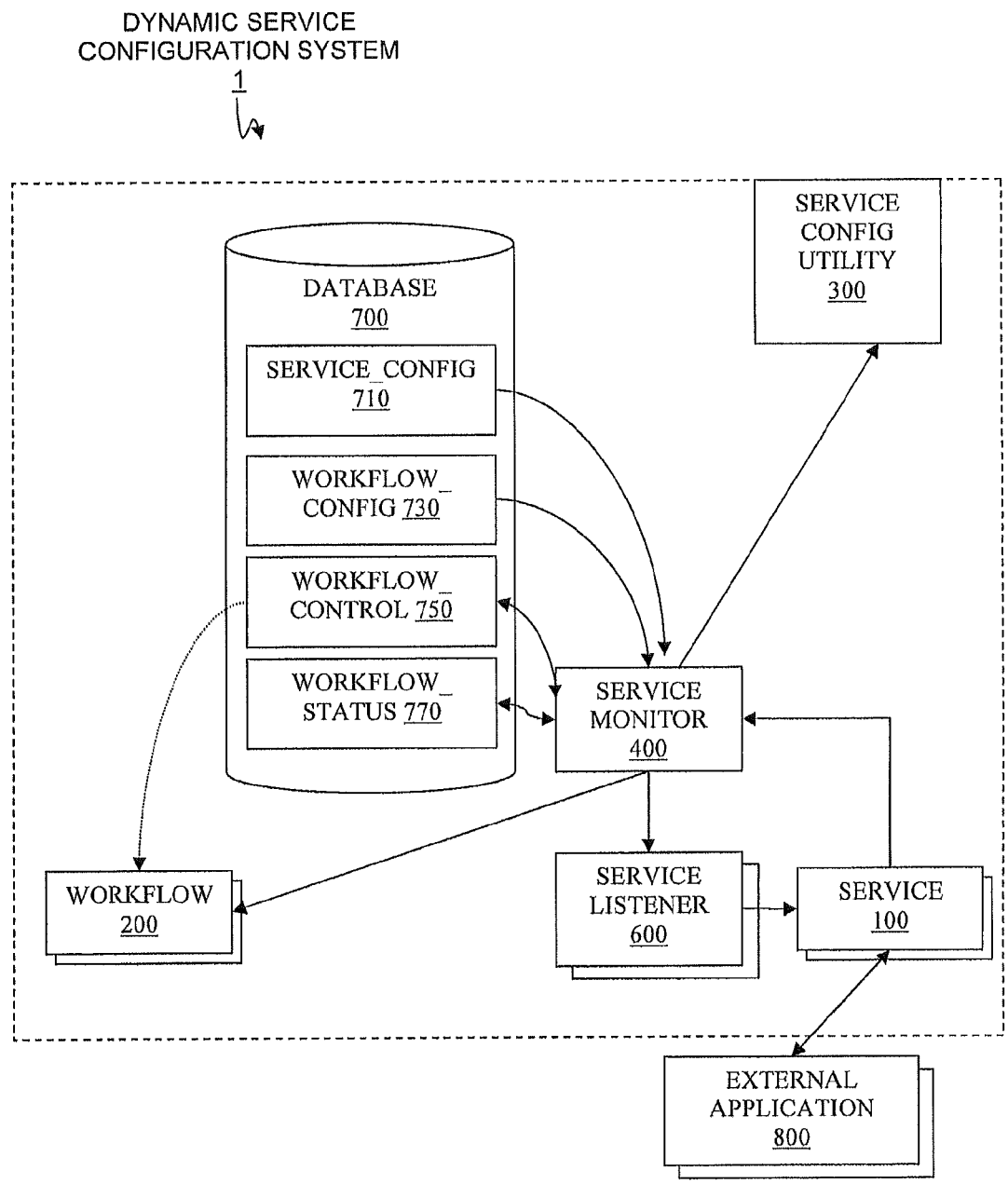
FIG. 3c depicts a flow of data in which the dynamic service configuration system uses the workflow created in FIG. 3b, to achieve a desired service, in accordance with the embodiments of the present invention.

FIG. 3c depicts a flow of data in which the dynamic service configuration system 1 uses the workflow 200 created in FIG. 3b, supra, to achieve a desired service 100, in accordance with the embodiments of the present invention.

The service monitor 400 connects a workflow 200 to a corresponding service 100 through a service listener 600. The service monitor 400 controls the execution of the workflow 200 by manipulating the workflow control record WORKFLOW_CONTROL 750. Once the service 100 completes the execution of a corresponding external application 800, the service 100 reports the resulting status of the workflow to the service monitor 400. The service monitor 400 records the execution result information by updating the contents of the workflow status records WORKFLOW_STATUS 770. According to the service configuration record SERVICE_CONFIG 710 and the workflow configuration record WORKFLOW_CONFIG 730, the service monitor 400 determines further processing and reports to the service configuration utility 300. See FIGS. 5, 5a, 5b, and 5c, infra, for the flowchart of the service monitor 400.

Figure 4:
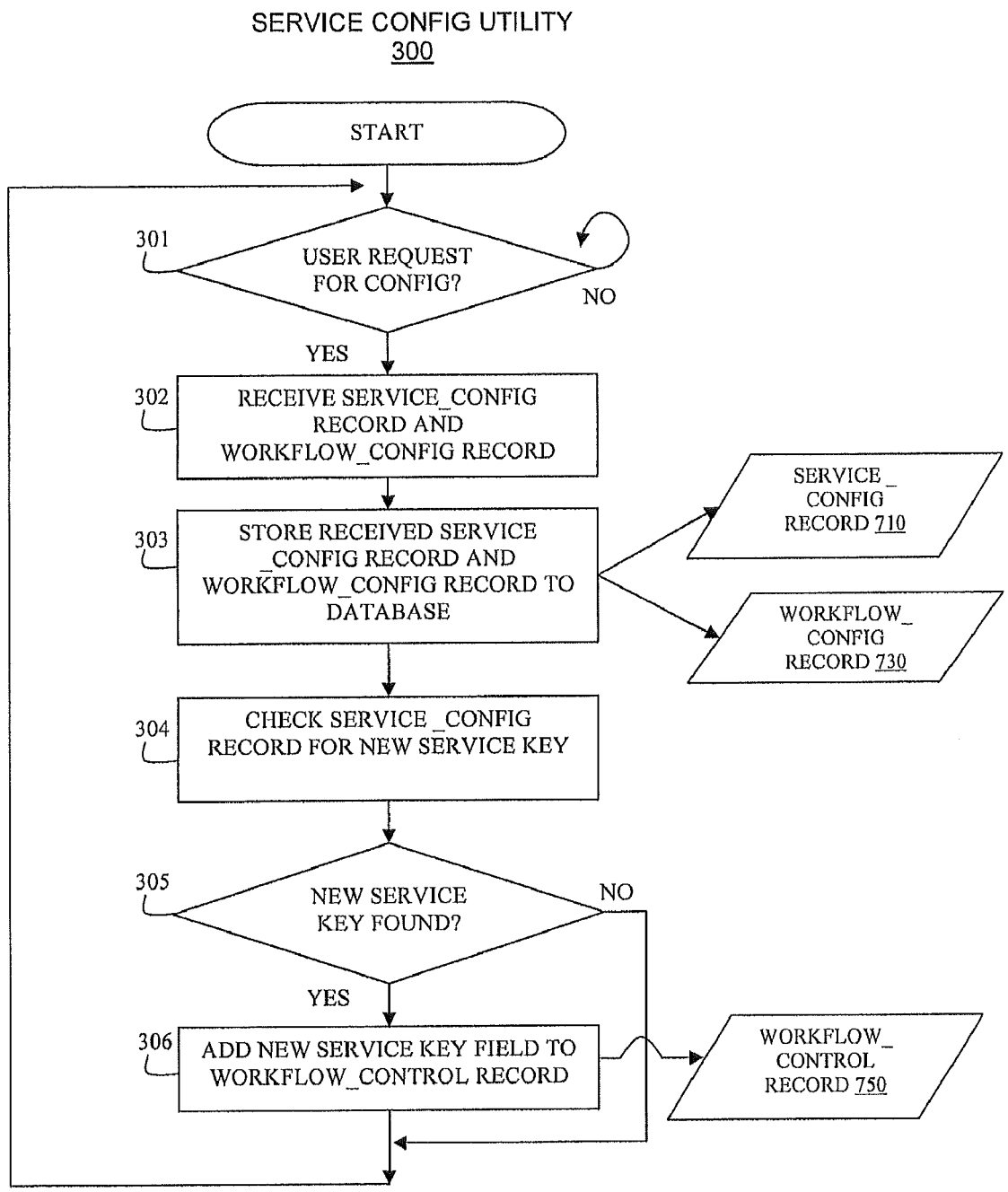
FIG. 4 is a flowchart of the service configuration utility of the dynamic service configuration system, in accordance with embodiments of the present invention.

FIG. 4 is a flowchart of the service configuration utility 300 of the dynamic service configuration system 1, in accordance with embodiments of the present invention.

The service configuration utility 300 enables users of the system to configure the service monitor 400, individual workflows 200 and services 100 by creating service configuration record SERVICE_CONFIG 710 and workflow configuration record WORKFLOW_CONFIG 730 in the database 700. The service configuration utility 300 also provides a user interface which may display workflow control record WORKFLOW_CONTROL 750 and workflow status record WORKFLOW_STATUS 770, stop and start service listeners 600 and workflows 200, and manage service errors by sending request to service listener to retry a workflow event.

In step 301, the service configuration utility 300 receives a user request for configuring a service or a workflow.

In step 302, the service configuration utility 300 receives service configuration record and workflow configuration record from a user to configure new service or workflow requested. Each service must have a service configuration record before being integrated within a workflow configuration.

In step 303, the service configuration utility 300 stores received service configuration record and workflow configuration record to database 700. Each service must have a service configuration record before being integrated within a workflow configuration.

In step 304, the service configuration utility 300 checks service configuration record SERVICE_CONFIG 710 for a new value in the service key field SC_SERVICE_KEY 712 in the service configuration record SERVICE_CONFIG 710.

In step 305, the service configuration utility 300 determines whether a new value for the SC_SERVICE_KEY field 712 in the service configuration record SERVICE_CONFIG 710 has been found. If the service configuration utility 300 determines that a new value for the service key field SC_SERVICE_KEY 712 in the service configuration record SERVICE_CONFIG 710 has been found, then in step 306, the service configuration utility 300 adds a new service key field WT_SERVICE_KEY_K 752-K to the workflow control record WORKFLOW_CONTROL 750, and then loops back to step 301 to wait for another user request. If the service configuration utility determines that a new value for the service key field SC_SERVICE_KEY 712 in the service configuration record SERVICE_CONFIG 710 has not been found, the service configuration utility loops back to step 301 to wait for another user request.

Figure 5:
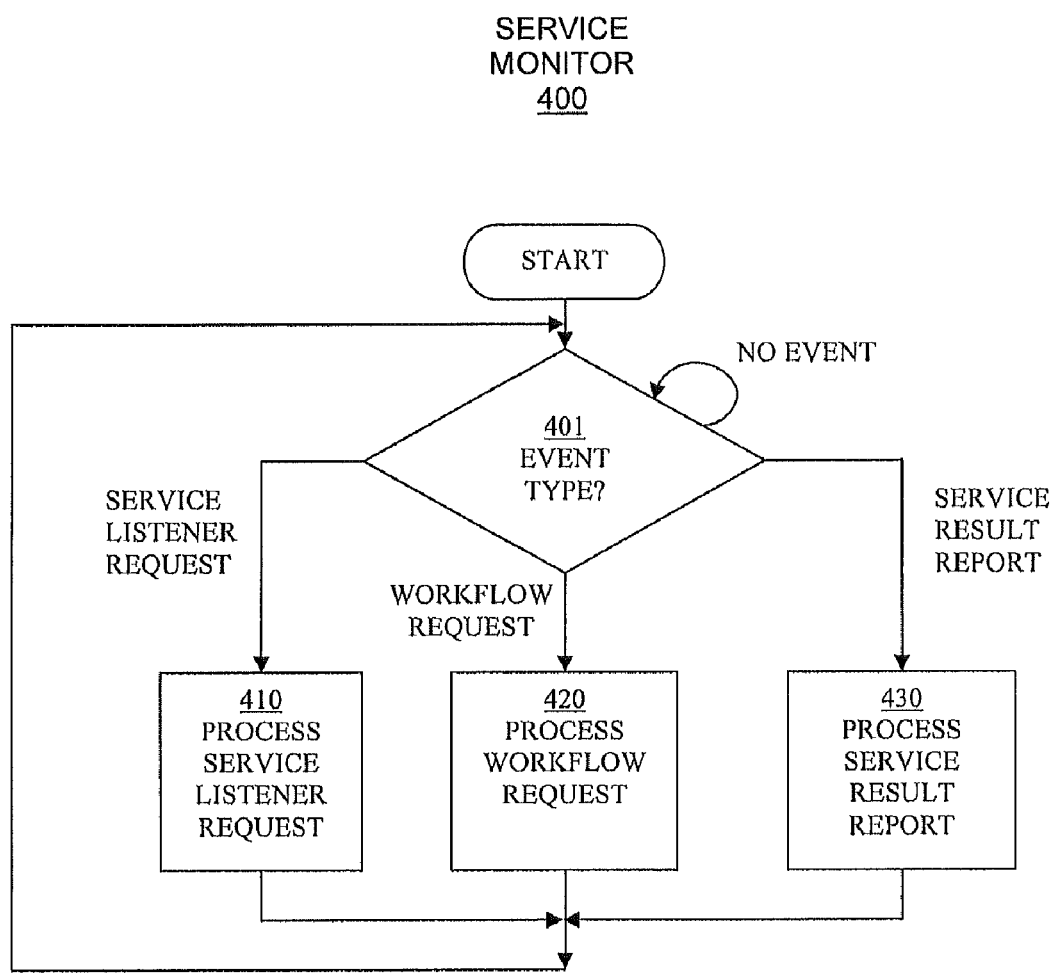
FIG. 5 is a flowchart of a service monitor of the dynamic service configuration system, in accordance with embodiments of the present invention.

FIG. 5 is a flowchart of a service monitor 400 of the dynamic service configuration system 1, in accordance with embodiments of the present invention.

After the service configuration utility 300 initializes the workflow control record WORKFLOW_CONTROL 750 and the workflow status record WORKFLOW_STATUS 770, the service monitor 400 operates the workflow control record WORKFLOW_CONTROL 750 when processing the actual workflows.

In step 401, the service monitor 400 waits for an event to occur, and determines the type of an event that has occurred. If the service monitor 400 determines that a service listener request has occurred, the service monitor branches to step 410 to process the service listener request. See FIG. 5a, infra, for details of step 410. If the service monitor 400 determines that a workflow request has occurred, the service monitor 400 branches to step 420 to process the workflow request. See FIG. 5*b*, infra, for details of step 420. If the service monitor 400 determines that the event occurred is a service result report, the service monitor 400 branches to step 430 to process the service result report. See FIG. 5*c*, infra, for details of step 430. If the service monitor 400 determines that no event has occurred, in step 401, the service monitor waits for an event to occur. After processing any one of steps 410, 420, and 430, the service monitor 400 loops back to step 401 to proceed with another event.

Figure 5A:
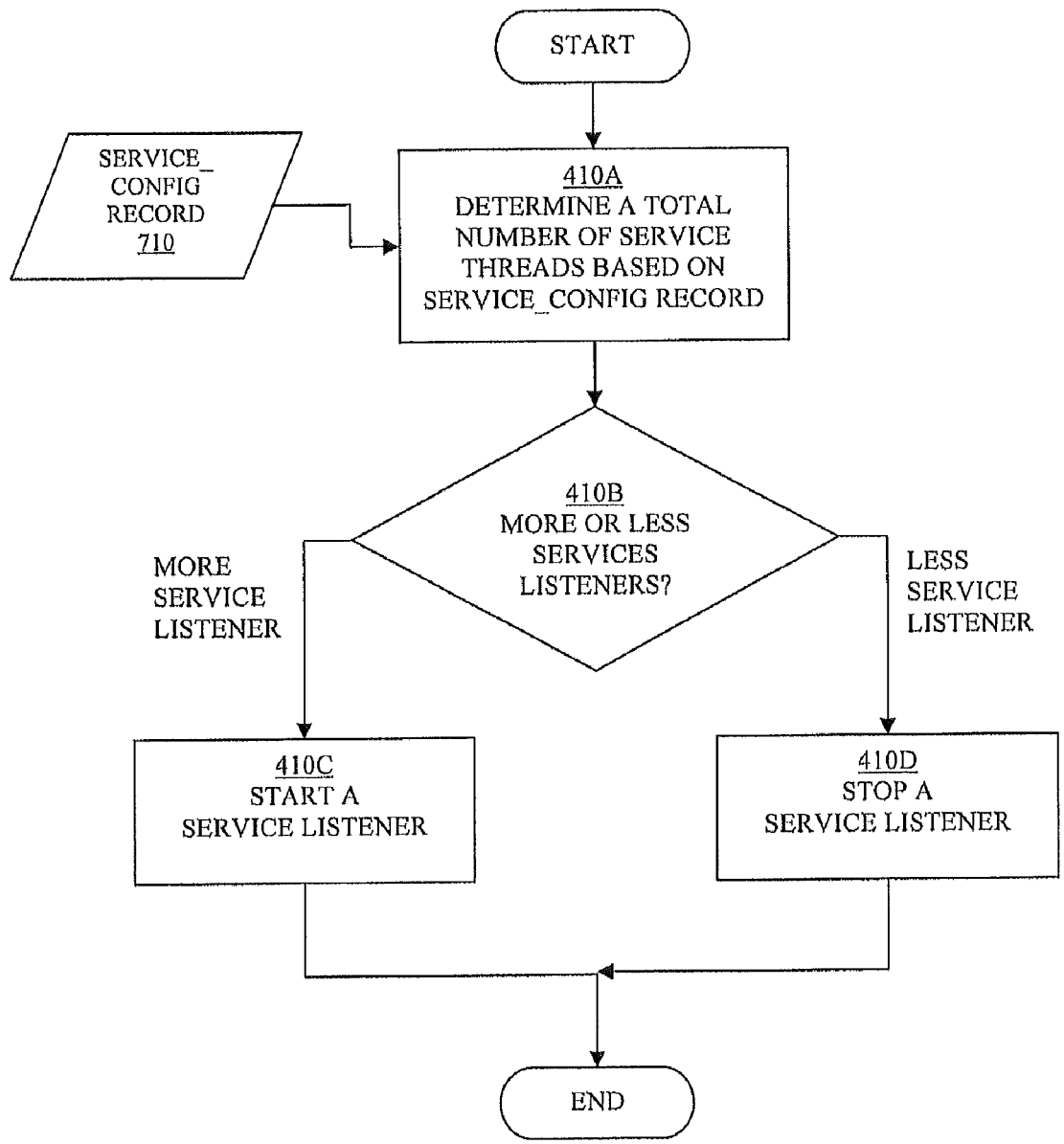
FIG. 5a is a detailed flowchart for step 410 of FIG. 5, describing the service monitor that processes a service listener request, in accordance with embodiments of the present invention.

FIG. 5*a* is a detailed flowchart for step 410 of FIG. 5, supra, describing the service monitor 400 that processes a service listener request, in accordance with embodiments of the present invention.

The service listener request refers to a request to increase or decrease a total number of services in the at least one service running in the dynamic configuration system 1. In step 410A, the service monitor 400 reads the service configuration record SERVICE_CONFIG 710 to determine how many service threads can be simultaneously active for the service identified in the service listener request by reading the minimum number of service threads field SC_MIN_SRVC 714, and the maximum number of service threads field SC_MAX_SRVC 715 for the current service identified in the service identifier field of the service configuration record SC_SERVICE 711.

In step 410B, the service monitor 400 determines whether to increase or to decrease the total number of said at least one service. If the service monitor 400 determines that more service thread is required, the service monitor 400 branches to step 410C. In step 410C, the service monitor 400 starts at least one new service listener in step 410C. If the service monitor 400 determines that there are too many service threads for the service, the service monitor branches to step 410D. In step 410D, the service monitor 400 stops at least one existing service listener.

Figure 5B:
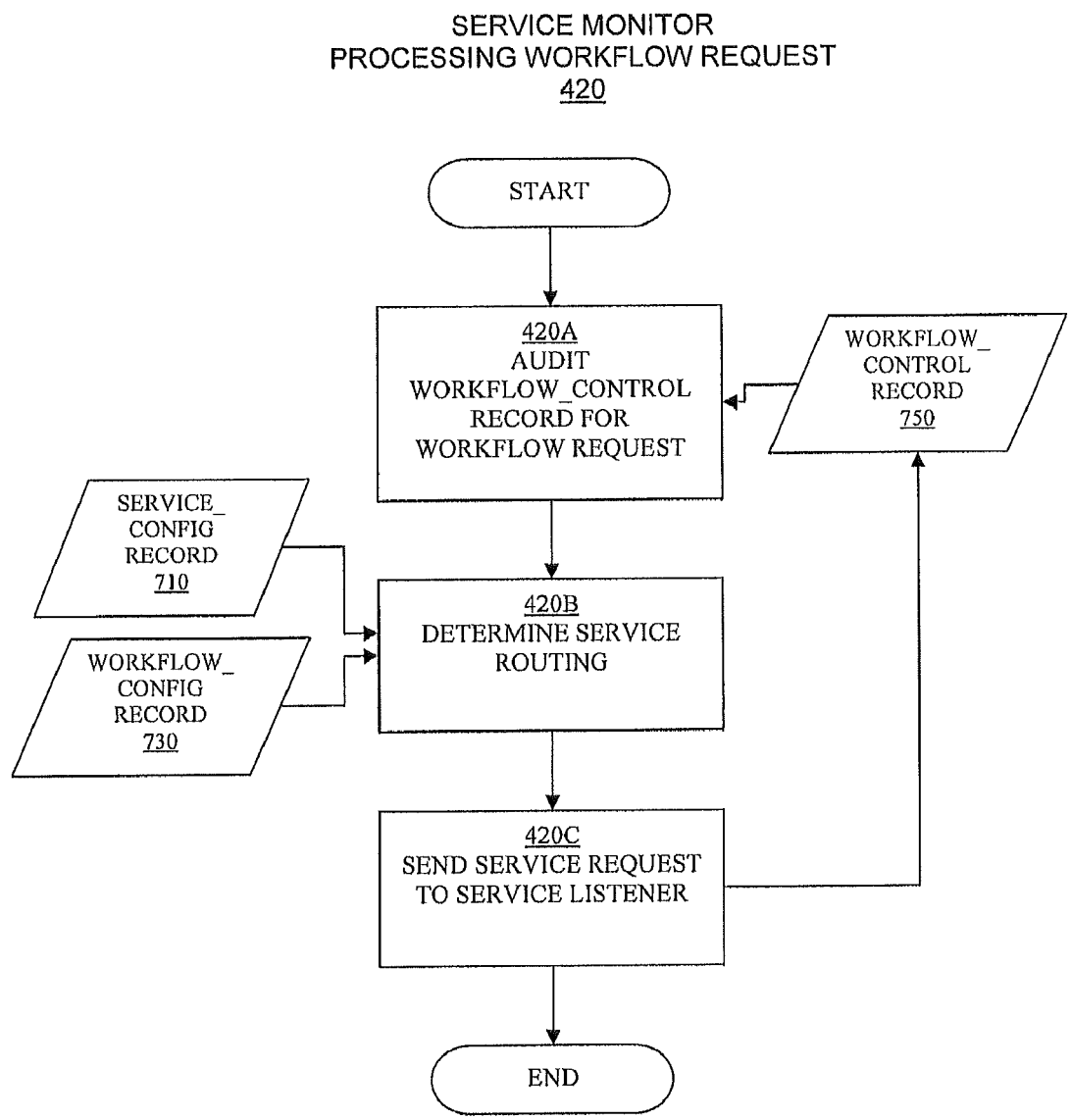
FIG. 5b is a detailed flowchart for step 420 of FIG. 5, describing the service monitor that processes a workflow request, in accordance with embodiments of the present invention.

FIG. 5*b* is a detailed flowchart for step 420 of FIG. 5, supra, describing the service monitor 400 that processes a workflow request, in accordance with embodiments of the present invention.

In step 420A, the service monitor 400 audits a workflow control record WORKFLOW_CONTROL 750 corresponding to the workflow request received in step 401.

In step 420B, the service monitor 400 determines a service routing using the service configuration record SERVICE_CONFIG 710 and the workflow configuration record WORKFLOW_CONFIG 730. The service routing means identifying at least one service request comprising workflow request received and determining the order of execution of identified services. The service routing is determined based on the values of at least one sequence field of workflow configuration record and the values of at least one service key field of service configuration record comprising the workflow identified in the workflow request.

In step 420C, the service monitor 400 sends at least one service request to a corresponding service listener determined in step 420B by updating the contents of the workflow control record WORKFLOW_CONTROL 750. The service listener that receives the service request will invoke a service for the workflow. When a service is invoked by a service listener, the service monitor 400 initializes the status field WT_STATUS 754 in the workflow control record WORKFLOW_CONTROL 750 to S to indicate that the service has started.

Figure 5C:
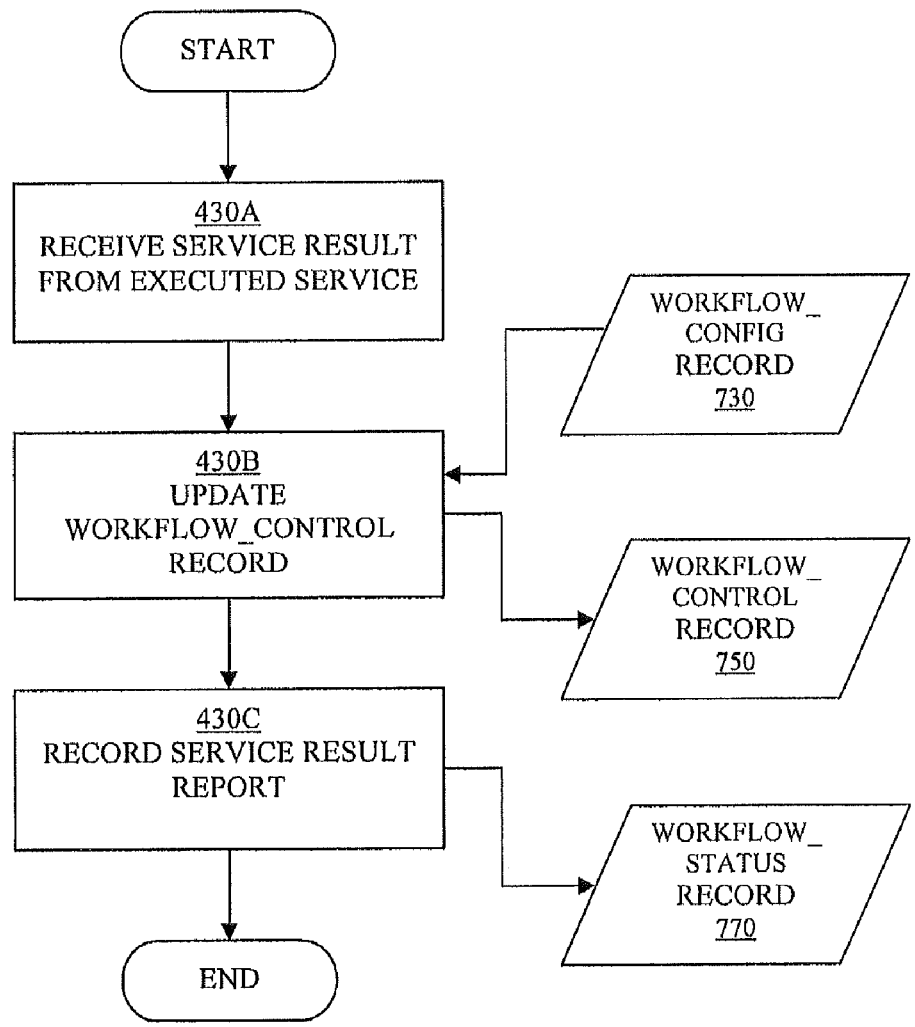
FIG. 5c is a detailed flowchart for step 430 of FIG. 5, describing the service monitor that processes a service result report, in accordance with embodiments of the present invention.

FIG. 5*c* is a detailed flowchart for step 430 of FIG. 5, supra, describing the service monitor 400 that processes a service result report, in accordance with embodiments of the present invention.

In step 430A, the service monitor 400 receives a service result report from a service invoked by a service listener in step 420C after execution of an external application.

In step 430B, the service monitor 400 updates the workflow control record WORKFLOW_CONTROL 750 corresponding to the result of the service execution.

If a service that sends the service result report to the service monitor 400 had successfully completed the execution, the service monitor 400 updates the sequence field WT_SEQUENCE 753 in the workflow control record WORKFLOW_ CONTROL 750 and creates and/or updates the sequence field WS_SEQUENCE 774 in the workflow status record WORKFLOW_STATUS 770. The service monitor 400 also clears the status field WT_STATUS 754 of the workflow control record WORKFLOW_CONTROL 750 to proceed with the next service within the workflow based upon the workflow configuration record WORKFLOW_CONFIG 730. The sequence field WT_SEQUENCE 753 is set to the value of the next sequence field WC_NEXT_SEQUENCE 734 of the workflow configuration record WORKFLOW_CONFIG 730.

If the service failed to successfully complete the execution, the service monitor 400 will set the status_field WT_STATUS 754 of the workflow control record WORKFLOW_CONTROL 750 and the status field WS_STATUS 775 of the workflow status record WORKFLOW_STATUS 770 to E to indicate that the service has erred. However, the service monitor 400 does not change the sequence field WT_SEQUENCE 753 of the workflow control record WORKFLOW_CONTROL 750.

The service monitor 400 checks only the services with the status field WT_STATUS 754 of the workflow control record WORKFLOW_CONTROL 750 with null value, which indicates that the workflow has not started yet. A service request may be issued only for those services with null value for the status field WT_STATUS 754 of the workflow control record WORKFLOW_CONTROL 750.

Similarly, the service configuration utility 300 may set retry option by providing a proper value in the retry sequence field WC_RETRY_SEQUENCE 735 only for services in an E status indicating that the service has erred.

In step 430C, the service monitor 400 records the status by updating the workflow status record WORKFLOW_STATUS 770 with a message indicating success or failure for all services for the workflow. The service monitor 400 determines whether to proceed with the next service within the workflow or to retry the same service within the workflow in case of the service having failed. See FIG. 2*b*, supra, for the contents of messages from a service in the description of the status field WT_STATUS 754 of the workflow control record WORKFLOW_CONTROL 750.

Figure 6:
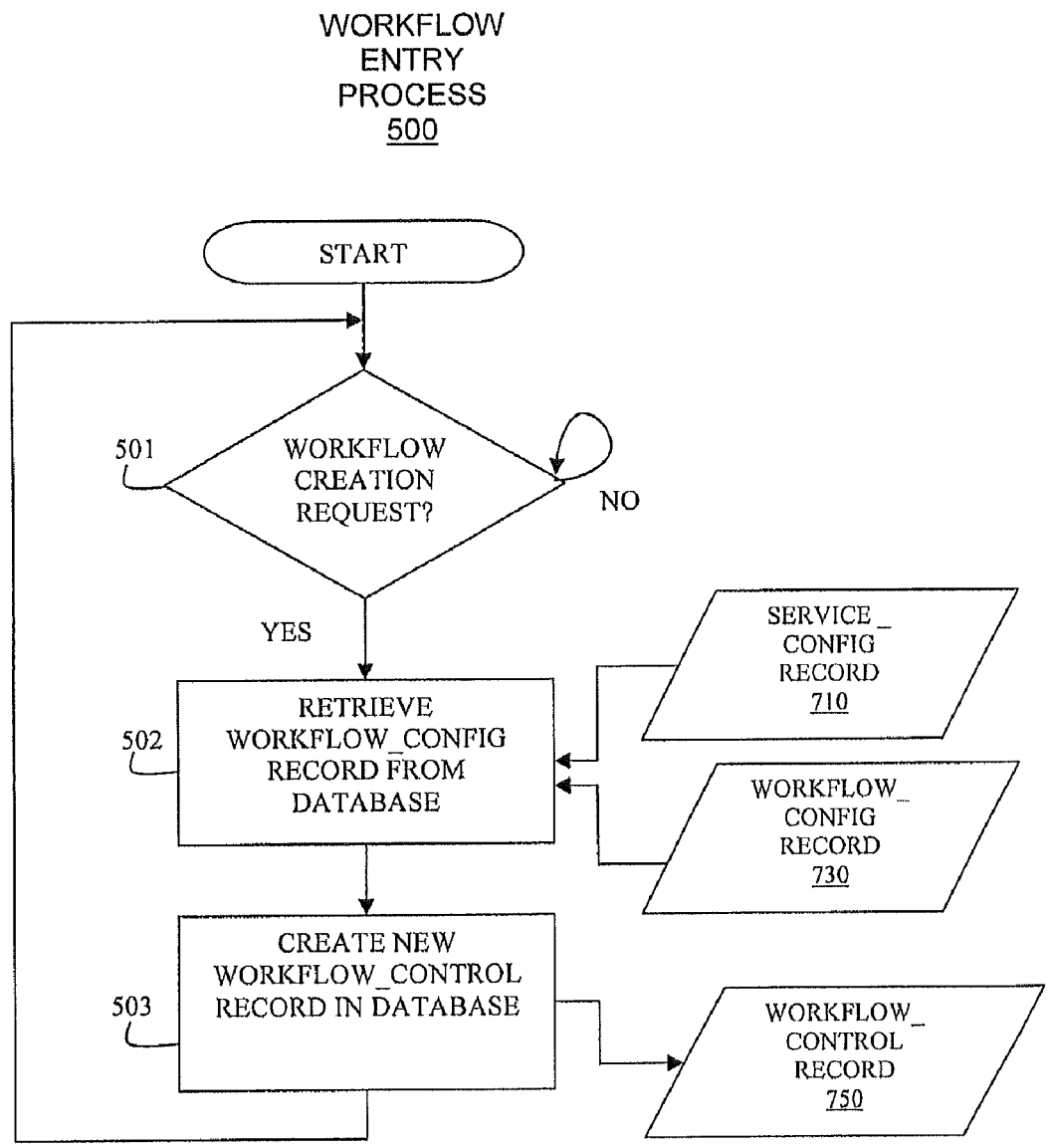
FIG. 6 is a flowchart of a work entry process of the dynamic service configuration system, in accordance with embodiments of the present invention.

FIG. 6 is a flowchart of a work entry process 500 of the dynamic service configuration system 1, in accordance with embodiments of the present invention.

In step 501, the workflow entry process 500 waits for and receives a workflow creation request to create a new workflow through the service configuration utility 300.

In step 502, the workflow entry process 500 retrieves a workflow configuration record WORKFLOW_CONFIG 730 and a service configuration record SERVICE_CONFIG 710 from the database 700 according to the workflow creation request.

In step 503, the workflow entry process 500 creates a new workflow and adds a new workflow control record WORKFLOW_CONTROL 750 in database 700.

After step 503, the workflow entry process 500 loops back to step 501 to process another workflow creation request.

FIG. 7 illustrates instances in relevant fields within records of the database 700, in accordance with embodiments of the present invention.

In the first embodiment of the present invention described in FIG. 2a, supra, the service configuration data structure has five database entries comprising five services: AUDIT_1 service, AUDIT_2 service, CREATE_ORDER service, SEND_ORDER service, and SEND_INVOICE service. In SC_SERVICE_KEY field 712 of each service, AUDIT_1 and AUDIT_2 services have ITEM service key value, CREATE_ORDER service has ITEM_ENTITY service key value, and SEND_ORDER and SEND_INVOICE services have ORDER service key value. The CREATE_ORDER service is configured to run based on ITEM_ENTITY service key, which means a workflow performing CREATE_ORDER service will group all workflow entries that has ITEM_ENTITY service key at the CREATE_ORDER service. The service monitor 400 must wait for all the workflow entries in the ITEM_ENTITY group to arrive at the CREATE_ORDER sequence, which is configured as 20 in the workflow configuration record 730 in FIG. 7, before invoking the CREATE_ORDER service. This validates a fact that both AUDIT_1 service and AUDIT_2 service have successfully executed before creating an order for any of the items on the order, ensuring a successful order creation.

Figure 8:
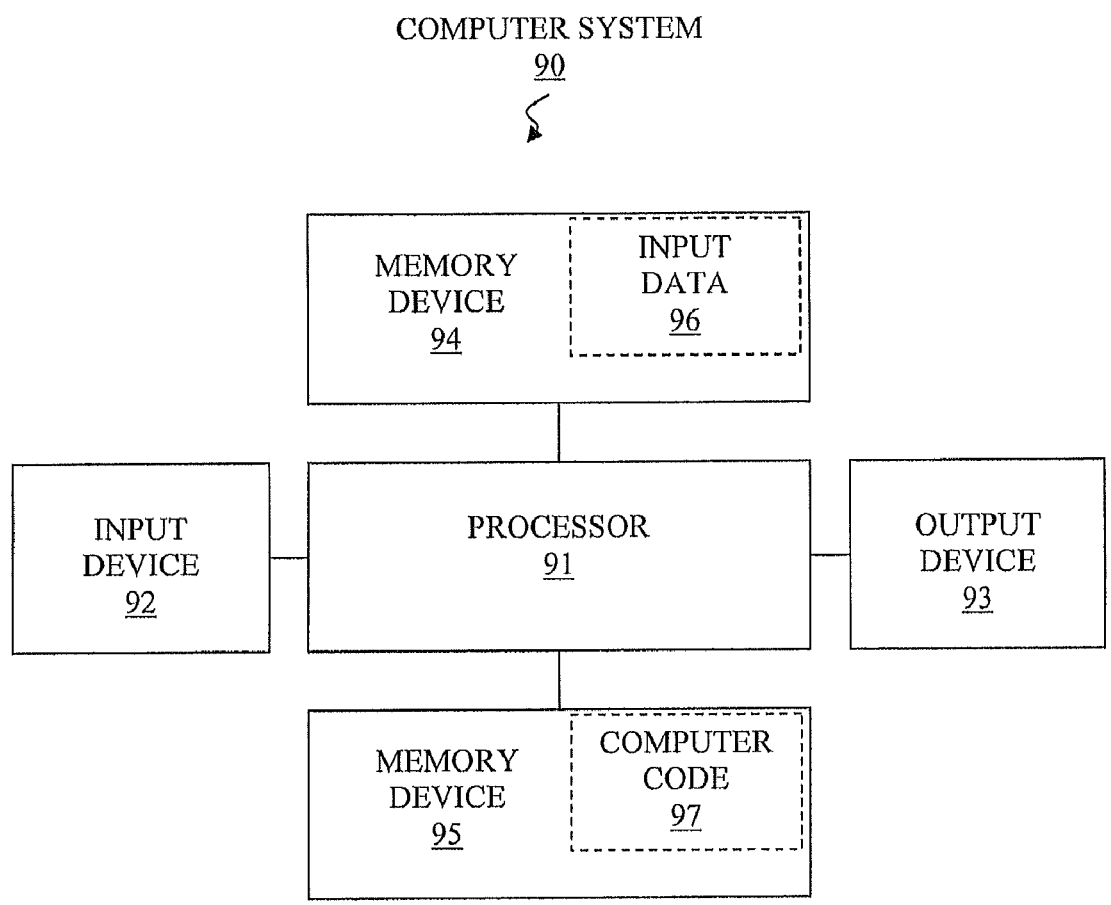
FIG. 8 illustrates a computer system used for dynamically configuring a multiplatform environment, in accordance with embodiments of the present invention.

FIG. 8 illustrates a computer system 90 used for dynamically configuring a multiplatform environment, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for dynamically configuring a multiplatform environment according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for dynamically configuring a multiplatform computing environment of the present invention. Thus, the present invention discloses a process for supporting computer infrastructure, comprising creating, integrating, hosting, maintaining, and deploying computer-readable code into a computing system (e.g., computing system 90), wherein the code in combination with the computing system is capable of performing a method for dynamically configuring a multiplatform environment.

In another embodiment, the invention provides a business method that performs the process steps of the invention on a subscription, advertising and/or fee basis. That is, a service provider, such as a Solution Integrator, can offer to create, maintain, support, etc. a process for dynamically configuring a multiplatform computing environment of the present invention. In this case, the service provider can create, maintain, and support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for dynamically configuring a multiplatform computing system comprising at least one service, at least one workflow, a service configuration utility, a workflow entry process, a service monitor, at least one service listener, and a database, wherein the at least one service, said at least one workflow, the service configuration utility, the workflow entry process, the service monitor, and said at least one service listener are executed on the multiplatform computing system, wherein the multiplatform computing system comprises at least one computer system, wherein the database is coupled to the multiplatform computing system, wherein the database comprises at least one service configuration record, at least one workflow configuration record, at least one workflow control record, and at least one workflow status record, the method comprising:

receiving a dynamic configuration request from a user through the service configuration utility, wherein said dynamic configuration request comprises a first data set to configure said at least one service and a second data set to configure said at least one workflow, wherein the first data set comprises values corresponding to respective fields of said at least one service configuration record, wherein said respective fields of said at least one service configuration record comprises a service identifier field and a service key field, a value in the service identifier field identifying each service configuration record that corresponds to a respective service, a value in the service key field indicating a respective runtime environment of the multiplatform computing system to perform the respective service identified by the service identifier field, wherein the second data set comprises values corresponding to respective fields of said at least one workflow configuration record, wherein said respective fields of said at least one workflow configuration record comprises a workflow identifier field and a service field, a value in the workflow identifier field identifying each workflow configuration record that corresponds to a respective workflow, a value in the service field identifying a member service that is performed as a part of the respective workflow;

updating contents of the database pursuant to the first data set and the second data set of the received dynamic configuration request, wherein said contents of the database comprise said at least one service configuration record and said at least one workflow configuration record, wherein said contents are identified by a first value from the first data set and a second value from the second data set of the received dynamic configuration request, wherein the first value identifies a target service configuration record to which the dynamic configuration request is directed, and wherein the second value identifies a target workflow configuration record to which the dynamic configuration request is directed; and processing said at least one workflow pursuant to the updated contents of the database such that the user performs an action selected from the group consisting of event handling and workflow creation, wherein the event handling is performed by the service monitor, and wherein the workflow creation is performed by the workflow entry process, wherein each workflow control record of said at least one workflow control record comprises a workflow identifier field, wherein each workflow status record of said at least one workflow status record comprises a workflow identifier field.

2. The method of claim 1, said updating performed by the service configuration utility, said updating comprising:

storing in the database the first data set in a first service configuration record of said at least one service configuration record, wherein the service identifier field of the first service configuration record has the first value from the first data set of the dynamic configuration request such that the first service configuration record is identical to the target service configuration record;

storing in the database the second data set in a first workflow configuration record of said at least one workflow configuration record, wherein the workflow identifier field of the first workflow configuration record has the second value from the second data set of the dynamic configuration request such that the first workflow configuration record is identical to the target workflow configuration record;

determining that the first data set comprises a new service key value corresponding to the service key field, wherein the new service key value is not equal to any value in a respective service key field of said at least one service configuration record; and adding a new service key field that has the new service key value to each workflow control record that is identified by the second value such that each workflow controlled by said each workflow control record is performed with a new resource information associated with the respective new service key value for the service key field.

3. The method of claim 1, said processing of the event handling performed by the service monitor, said processing comprising:

detecting an event, wherein the event is selected from the group consisting of a service listener request, a workflow request, and a service result report;

determining that the detected event is a service listener request comprising a service id value;

retrieving from the database a first service configuration record of said at least one service configuration record, wherein the service identifier field of the first service configuration record has a same value as the service id value of the determined service listener request;

concluding that the determined service listener request is to increase a total number of threads of services of said at least one service in accordance with the retrieved first service configuration record; and starting a service listener of said at least one service listener designated by the service listener request to invoke a service identified by the service id value.

4. The method of claim 1, said processing of the event handling being performed by the service monitor, said processing comprising:

detecting an event, wherein the event is selected from the group consisting of a service listener request, a workflow request, and a service result report;

determining that the detected event is a service listener request comprising a service id value;

retrieving from the database a first service configuration record of said at least one service configuration record, wherein the service identifier field of the first service configuration record has a same value as the service id value of the determined service listener request;

concluding that the determined service listener request is to decrease a total number of threads of services of said at least one service in accordance with the retrieved first service configuration record; and stopping a service listener of said at least one service listener designated by the service listener request to cease a service identified by the service id value.

5. The method of claim 1, said processing of the event handling being performed by the service monitor, said processing comprising:

detecting an event, wherein the event is selected from the group consisting of a service listener request, a workflow request, and a service result report;

determining that the detected event is a workflow request comprising a workflow id value;

auditing a first workflow control record of said at least one workflow control record, wherein the workflow identifier field in the first workflow control record has a same value as the workflow id value of the determined workflow request;

examining a first workflow configuration record of said at least one workflow configuration record, wherein the workflow identifier field in the first workflow configuration record has a same value as the workflow identifier field of the audited first workflow control record;

selecting a first service configuration record of said at least one service configuration record, wherein the service field in the first workflow configuration field has a same value as the service identifier field of the first service configuration record; and sending a service request for a first service identified by the service identifier filed of the first service configuration record to a first service listener responsible for invoking the first service.

6. The method of claim 1, said processing of the event handling being performed by the service monitor, said processing comprising:

detecting an event, wherein the event is selected from the group consisting of a service listener request, a workflow request, and a service result report;

determining that the detected event is a service result report comprising a workflow id value and a result status data;

modifying a first workflow control record of said at least one workflow control record to include the service result report as dictated by a first workflow configuration record of said at least one workflow configuration record, wherein the workflow identifier field of the first workflow control record has a same value as the workflow id value, wherein the workflow identifier field of the first workflow configuration record has a same value as the workflow id value; and recording the service result report into a first workflow status record of said at least one workflow status record in the database, wherein the workflow identifier field of the first workflow status record has a same value as the workflow id of the service result report.

7. The method of claim 1, said processing of the workflow creation being performed by the workflow entry process, said processing comprising:

retrieving, from the updated contents of the database, the target service configuration record and the target workflow configuration record;

creating the new workflow and a new workflow control record associated with the new workflow according to values of the target service configuration record and the target workflow configuration record, wherein the new workflow control record is identified by the second value from the second data set of the received dynamic configuration request; and inserting the new workflow control record in the database.

8. A computer program product, comprising a computer usable medium having a computer readable program code embodied therein, said computer readable program code containing instructions that when executed by a processor of a computer system implement a method for dynamically configuring a multiplatform computing system comprising at least one service, at least one workflow, a service configuration utility, a workflow entry process, a service monitor, at least one service listener, and a database, wherein the at least one service, said at least one workflow, the service configuration utility, the workflow entry process, the service monitor, and said at least one service listener are executed on the multiplatform computing system, wherein the multiplatform computing system comprises at least one computer system, wherein the database is coupled to the multiplatform computing system, wherein the database comprises at least one service configuration record, at least one workflow configuration record, at least one workflow control record, and at least one workflow status record, the method comprising:

receiving a dynamic configuration request from a user through the service configuration utility, wherein said dynamic configuration request comprises a first data set to configure said at least one service and a second data set to configure said at least one workflow, wherein the first data set comprises values corresponding to respective fields of said at least one service configuration record, wherein said respective fields of said at least one service configuration record comprises a service identifier field and a service key field, a value in the service identifier field identifying each service configuration record that corresponds to a respective service, a value in the service key field indicating a respective runtime environment of the multiplatform computing system to perform the respective service identified by the service identifier field, wherein the second data set comprises values corresponding to respective fields of said at least one workflow configuration record, wherein said respective fields of said at least one workflow configuration record comprises a workflow identifier field and a service field, a value in the workflow identifier field identifying each workflow configuration record that corresponds to a respective workflow, a value in the service field identifying a member service that is performed as a part of the respective workflow;

updating contents of the database pursuant to the first data set and the second data set of the received dynamic configuration request, wherein said contents of the database comprise said at least one service configuration record and said at least one workflow configuration record, wherein said contents are identified by a first value from the first data set and a second value from the second data set of the received dynamic configuration request, wherein the first value identifies a target service configuration record to which the dynamic configuration request is directed, and wherein the second value identifies a target workflow configuration record to which the dynamic configuration request is directed; and processing said at least one workflow pursuant to the updated contents of the database such that the user performs an action selected from the group consisting of event handling and workflow creation, wherein the event handling is performed by the service monitor, and wherein the workflow creation is performed by the workflow entry process, wherein each workflow control record of said at least one workflow control record comprises a workflow identifier field, wherein each workflow status record of said at least one workflow status record comprises a workflow identifier field.

9. The computer program product of claim 8, said updating performed by the service configuration utility, said updating comprising:

storing in the database the first data set in a first service configuration record of said at least one service configuration record, wherein the service identifier field of the first service configuration record has the first value from the first data set of the dynamic configuration request such that the first service configuration record is identical to the target service configuration record;

storing in the database the second data set in a first workflow configuration record of said at least one workflow configuration record, wherein the workflow identifier field of the first workflow configuration record has the second value from the second data set of the dynamic configuration request such that the first workflow configuration record is identical to the target workflow configuration record;

determining that the first data set comprises a new service key value corresponding to the service key field, wherein the new service key value is not equal to any value in a respective service key field of said at least one service configuration record; and adding a new service key field that has the new service key value to each workflow control record that is identified by the second value such that each workflow controlled by said each workflow control record is performed with a new resource information associated with the respective new service key value for the service key field.

10. The computer program product of claim 8, said processing of the event handling performed by the service monitor, said processing comprising:
  detecting an event, wherein the event is selected from the group consisting of a service listener request, a workflow request, and a service result report;
  determining that the detected event is a service listener request comprising a service id value;
  retrieving from the database a first service configuration record of said at least one service configuration record, wherein the service identifier field of the first service configuration record has a same value as the service id value of the determined service listener request;
  concluding that the determined service listener request is to increase a total number of threads of services of said at least one service in accordance with the retrieved first service configuration record; and
  starting a service listener of said at least one service listener designated by the service listener request to invoke a service identified by the service id value.

11. The computer program product of claim 8, said processing of the event handling being performed by the service monitor, said processing comprising:
  detecting an event, wherein the event is selected from the group consisting of a service listener request, a workflow request, and a service result report;
  determining that the detected event is a service listener request comprising a service id value;
  retrieving from the database a first service configuration record of said at least one service configuration record, wherein the service identifier field of the first service configuration record has a same value as the service id value of the determined service listener request;
  concluding that the determined service listener request is to decrease a total number of threads of services of said at least one service in accordance with the retrieved first service configuration record; and
  stopping a service listener of said at least one service listener designated by the service listener request to cease a service identified by the service id value.

12. The computer program product of claim 8, said processing of the event handling being performed by the service monitor, said processing comprising:
  detecting an event, wherein the event is selected from the group consisting of a service listener request, a workflow request, and a service result report;
  determining that the detected event is a workflow request comprising a workflow id value;
  auditing a first workflow control record of said at least one workflow control record, wherein the workflow identifier field in the first workflow control record has a same value as the workflow id value of the determined workflow request;
  examining a first workflow configuration record of said at least one workflow configuration record, wherein the workflow identifier field in the first workflow configuration record has a same value as the workflow identifier field of the audited first workflow control record;
  selecting a first service configuration record of said at least one service configuration record, wherein the service field in the first workflow configuration field has a same value as the service identifier field of the first service configuration record; and
  sending a service request for a first service identified by the service identifier filed of the first service configuration record to a first service listener responsible for invoking the first service.

13. The computer program product of claim 8, said processing of the event handling being performed by the service monitor, said processing comprising:
  detecting an event, wherein the event is selected from the group consisting of a service listener request, a workflow request, and a service result report;
  determining that the detected event is a service result report comprising a workflow id value and a result status data;
  modifying a first workflow control record of said at least one workflow control record to include the service result report as dictated by a first workflow configuration record of said at least one workflow configuration record, wherein the workflow identifier field of the first workflow control record has a same value as the workflow id value, wherein the workflow identifier field of the first workflow configuration record has a same value as the workflow id value; and
  recording the service result report into a first workflow status record of said at least one workflow status record in the database, wherein the workflow identifier field of the first workflow status record has a same value as the workflow id of the service result report.

14. The computer program product of claim 8, said processing of the workflow creation being performed by the workflow entry process, said processing comprising:
  retrieving, from the updated contents of the database, the target service configuration record and the target workflow configuration record;
  creating the new workflow and a new workflow control record associated with the new workflow according to values of the target service configuration record and the target workflow configuration record, wherein the new workflow control record is identified by the second value from the second data set of the received dynamic configuration request; and
  inserting the new workflow control record in the database.

15. A computer system comprising a processor and a computer readable memory unit coupled to the processor, said memory unit containing instructions that when executed by the processor implement a method for dynamically configuring a multiplatform computing system comprising at least one service, at least one workflow, a service configuration utility, a workflow entry process, a service monitor, at least one service listener, and a database, wherein the at least one service, said at least one workflow, the service configuration utility, the workflow entry process, the service monitor, and said at least one service listener are executed on the multiplatform computing system, wherein the multiplatform computing system comprises at least one computer system, wherein the database is coupled to the multiplatform computing system, wherein the database comprises at least one service configuration record, at least one workflow configuration record, at least one workflow control record, and at least one workflow status record, the method comprising:
  receiving a dynamic configuration request from a user through the service configuration utility, wherein said dynamic configuration request comprises a first data set to configure said at least one service and a second data set to configure said at least one workflow, wherein the first data set comprises values corresponding to respective fields of said at least one service configuration record, wherein said respective fields of said at least one service configuration record comprises a service identifier field and a service key field, a value in the service identifier field identifying each service configuration record that corresponds to a respective service, a value in the service key field indicating a respective runtime environment of the multiplatform computing system to perform the respective service identified by the service identifier field, wherein the second data set comprises values corresponding to respective fields of said at least one workflow configuration record, wherein said respective fields of said at least one workflow configuration record comprises a workflow identifier field and a service field, a value in the workflow identifier field identifying each workflow configuration record that corresponds to a respective workflow, a value in the service field identifying a member service that is performed as a part of the respective workflow;

updating contents of the database pursuant to the first data set and the second data set of the received dynamic configuration request, wherein said contents of the database comprise said at least one service configuration record and said at least one workflow configuration record, wherein said contents are identified by a first value from the first data set and a second value from the second data set of the received dynamic configuration request, wherein the first value identifies a target service configuration record to which the dynamic configuration request is directed, and wherein the second value identifies a target workflow configuration record to which the dynamic configuration request is directed; and processing said at least one workflow pursuant to the updated contents of the database such that the user performs an action selected from the group consisting of event handling and workflow creation, wherein the event handling is performed by the service monitor, and wherein the workflow creation is performed by the workflow entry process, wherein each workflow control record of said at least one workflow control record comprises a workflow identifier field, wherein each workflow status record of said at least one workflow status record comprises a workflow identifier field.

16. The computer system of claim 15, said updating performed by the service configuration utility, said updating comprising:

storing in the database the first data set in a first service configuration record of said at least one service configuration record, wherein the service identifier field of the first service configuration record has the first value from the first data set of the dynamic configuration request such that the first service configuration record is identical to the target service configuration record;

storing in the database the second data set in a first workflow configuration record of said at least one workflow configuration record, wherein the workflow identifier field of the first workflow configuration record has the second value from the second data set of the dynamic configuration request such that the first workflow configuration record is identical to the target workflow configuration record;

determining that the first data set comprises a new service key value corresponding to the service key field, wherein the new service key value is not equal to any value in a respective service key field of said at least one service configuration record; and adding a new service key field that has the new service key value to each workflow control record that is identified by the second value such that each workflow controlled by said each workflow control record is performed with a new resource information associated with the respective new service key value for the service key field.

17. The computer system of claim 15, said processing of the event handling performed by the service monitor, said processing comprising:

detecting an event, wherein the event is selected from the group consisting of a service listener request, a workflow request, and a service result report;

determining that the detected event is a service listener request comprising a service id value;

retrieving from the database a first service configuration record of said at least one service configuration record, wherein the service identifier field of the first service configuration record has a same value as the service id value of the determined service listener request;

concluding that the determined service listener request is to increase a total number of threads of services of said at least one service in accordance with the retrieved first service configuration record; and starting a service listener of said at least one service listener designated by the service listener request to invoke a service identified by the service id value.

18. The computer system of claim 15, said processing of the event handling being performed by the service monitor, said processing comprising:

detecting an event, wherein the event is selected from the group consisting of a service listener request, a workflow request, and a service result report;

determining that the detected event is a service listener request comprising a service id value;

retrieving from the database a first service configuration record of said at least one service configuration record, wherein the service identifier field of the first service configuration record has a same value as the service id value of the determined service listener request;

concluding that the determined service listener request is to decrease a total number of threads of services of said at least one service in accordance with the retrieved first service configuration record; and stopping a service listener of said at least one service listener designated by the service listener request to cease a service identified by the service id value.

19. The computer system of claim 15, said processing of the event handling being performed by the service monitor, said processing comprising:

detecting an event, wherein the event is selected from the group consisting of a service listener request, a workflow request, and a service result report;

determining that the detected event is a workflow request comprising a workflow id value;

auditing a first workflow control record of said at least one workflow control record, wherein the workflow identifier field in the first workflow control record has a same value as the workflow id value of the determined workflow request;

examining a first workflow configuration record of said at least one workflow configuration record, wherein the workflow identifier field in the first workflow configuration record has a same value as the workflow identifier field of the audited first workflow control record;

selecting a first service configuration record of said at least one service configuration record, wherein the service field in the first workflow configuration field has a same value as the service identifier field of the first service configuration record; and sending a service request for a first service identified by the service identifier filed of the first service configuration record to a first service listener responsible for invoking the first service.

20. The computer system of claim 15, said processing of the event handling being performed by the service monitor, said processing comprising:
- detecting an event, wherein the event is selected from the group consisting of a service listener request, a workflow request, and a service result report;
- determining that the detected event is a service result report comprising a workflow id value and a result status data;
- modifying a first workflow control record of said at least one workflow control record to include the service result report as dictated by a first workflow configuration record of said at least one workflow configuration record, wherein the workflow identifier field of the first workflow control record has a same value as the workflow id value, wherein the workflow identifier field of the first workflow configuration record has a same value as the workflow id value; and
- recording the service result report into a first workflow status record of said at least one workflow status record in the database, wherein the workflow identifier field of the first workflow status record has a same value as the workflow id of the service result report.

21. The computer system of claim 15, said processing of the workflow creation being performed by the workflow entry process, said processing comprising:
- retrieving, from the updated contents of the database, the target service configuration record and the target workflow configuration record;
- creating the new workflow and a new workflow control record associated with the new workflow according to values of the target service configuration record and the target workflow configuration record, wherein the new workflow control record is identified by the second value from the second data set of the received dynamic configuration request; and
- inserting the new workflow control record in the database.

22. A process for supporting computer infrastructure, said process comprising providing at least one support service for at least one of creating, integrating, hosting, maintaining, and deploying computer-readable code in a computing system, wherein the code in combination with the computing system is capable of performing a method for dynamically configuring a multiplatform computing system comprising at least one service, at least one workflow, a service configuration utility, a workflow entry process, a service monitor, at least one service listener, and a database, wherein the at least one service, said at least one workflow, the service configuration utility, the workflow entry process, the service monitor, and said at least one service listener are executed on the multiplatform computing system, wherein the multiplatform computing system comprises at least one computer system, wherein the database is coupled to the multiplatform computing system, wherein the database comprises at least one service configuration record, at least one workflow configuration record, at least one workflow control record, and at least one workflow status record, the method comprising:
- receiving a dynamic configuration request from a user through the service configuration utility, wherein said dynamic configuration request comprises a first data set to configure said at least one service and a second data set to configure said at least one workflow, wherein the first data set comprises values corresponding to respective fields of said at least one service configuration record, wherein said respective fields of said at least one service configuration record comprises a service identifier field and a service key field, a value in the service identifier field identifying each service configuration record that corresponds to a respective service, a value in the service key field indicating a respective runtime environment of the multiplatform computing system to perform the respective service identified by the service identifier field, wherein the second data set comprises values corresponding to respective fields of said at least one workflow configuration record, wherein said respective fields of said at least one workflow configuration record comprises a workflow identifier field and a service field, a value in the workflow identifier field identifying each workflow configuration record that corresponds to a respective workflow, a value in the service field identifying a member service that is performed as a part of the respective workflow;
- updating contents of the database pursuant to the first data set and the second data set of the received dynamic configuration request, wherein said contents of the database comprise said at least one service configuration record and said at least one workflow configuration record, wherein said contents are identified by a first value from the first data set and a second value from the second data set of the received dynamic configuration request, wherein the first value identifies a target service configuration record to which the dynamic configuration request is directed, and wherein the second value identifies a target workflow configuration record to which the dynamic configuration request is directed; and
- processing said at least one workflow pursuant to the updated contents of the database such that the user performs an action selected from the group consisting of event handling and workflow creation, wherein the event handling is performed by the service monitor, and wherein the workflow creation is performed by the workflow entry process,
- wherein each workflow control record of said at least one workflow control record comprises a workflow identifier field,
- wherein each workflow status record of said at least one workflow status record comprises a workflow identifier field.

23. The process of claim 22, said updating performed by the service configuration utility, said updating comprising:
- storing in the database the first data set in a first service configuration record of said at least one service configuration record, wherein the service identifier field of the first service configuration record has the first value from the first data set of the dynamic configuration request such that the first service configuration record is identical to the target service configuration record;
- storing in the database the second data set in a first workflow configuration record of said at least one workflow configuration record, wherein the workflow identifier field of the first workflow configuration record has the second value from the second data set of the dynamic configuration request such that the first workflow configuration record is identical to the target workflow configuration record;
- determining that the first data set comprises a new service key value corresponding to the service key field, wherein the new service key value is not equal to any value in a respective service key field of said at least one service configuration record; and
- adding a new service key field that has the new service key value to each workflow control record that is identified by the second value such that each workflow controlled by said each workflow control record is performed with a new resource information associated with the respective new service key value for the service key field.

24. The process of claim 22, said processing of the event handling performed by the service monitor, said processing comprising:
- detecting an event, wherein the event is selected from the group consisting of a service listener request, a workflow request, and a service result report;
- determining that the detected event is a service listener request comprising a service id value;
- retrieving from the database a first service configuration record of said at least one service configuration record, wherein the service identifier field of the first service configuration record has a same value as the service id value of the determined service listener request;
- concluding that the determined service listener request is to increase a total number of threads of services of said at least one service in accordance with the retrieved first service configuration record; and
- starting a service listener of said at least one service listener designated by the service listener request to invoke a service identified by the service id value.

25. The process of claim 22, said processing of the event handling being performed by the service monitor, said processing comprising:
- detecting an event, wherein the event is selected from the group consisting of a service listener request, a workflow request, and a service result report;
- determining that the detected event is a service listener request comprising a service id value;
- retrieving from the database a first service configuration record of said at least one service configuration record, wherein the service identifier field of the first service configuration record has a same value as the service id value of the determined service listener request;
- concluding that the determined service listener request is to decrease a total number of threads of services of said at least one service in accordance with the retrieved first service configuration record; and
- stopping a service listener of said at least one service listener designated by the service listener request to cease a service identified by the service id value.

26. The process of claim 22, said processing of the event handling being performed by the service monitor, said processing comprising:
- detecting an event, wherein the event is selected from the group consisting of a service listener request, a workflow request, and a service result report;
- determining that the detected event is a workflow request comprising a workflow id value;
- auditing a first workflow control record of said at least one workflow control record, wherein the workflow identifier field in the first workflow control record has a same value as the workflow id value of the determined workflow request;
- examining a first workflow configuration record of said at least one workflow configuration record, wherein the workflow identifier field in the first workflow configuration record has a same value as the workflow identifier field of the audited first workflow control record;
- selecting a first service configuration record of said at least one service configuration record, wherein the service field in the first workflow configuration field has a same value as the service identifier field of the first service configuration record; and
- sending a service request for a first service identified by the service identifier filed of the first service configuration record to a first service listener responsible for invoking the first service.

27. The process of claim 22, said processing of the event handling being performed by the service monitor, said processing comprising:
- detecting an event, wherein the event is selected from the group consisting of a service listener request, a workflow request, and a service result report;
- determining that the detected event is a service result report comprising a workflow id value and a result status data;
- modifying a first workflow control record of said at least one workflow control record to include the service result report as dictated by a first workflow configuration record of said at least one workflow configuration record, wherein the workflow identifier field of the first workflow control record has a same value as the workflow id value, wherein the workflow identifier field of the first workflow configuration record has a same value as the workflow id value; and
- recording the service result report into a first workflow status record of said at least one workflow status record in the database, wherein the workflow identifier field of the first workflow status record has a same value as the workflow id of the service result report.

28. The process of claim 22, said processing of the workflow creation being performed by the workflow entry process, said processing comprising:
- retrieving, from the updated contents of the database, the target service configuration record and the target workflow configuration record;
- creating the new workflow and a new workflow control record associated with the new workflow according to values of the target service configuration record and the target workflow configuration record, wherein the new workflow control record is identified by the second value from the second data set of the received dynamic configuration request; and
- inserting the new workflow control record in the database.

* * * * *